US012068517B2

(12) United States Patent
Hollenbeck et al.

(10) Patent No.: US 12,068,517 B2
(45) Date of Patent: Aug. 20, 2024

(54) WAVEGUIDE FILTER COMPRISING A WAVEGUIDE CAVITY DEFINED BY PLURAL SIDEWALLS AND PLURAL RIDGES, WHERE ANY GIVEN RIDGE IS ATTACHED TO A CORRESPONDING SIDEWALL

(71) Applicant: Optisys, Inc., West Jordan, UT (US)

(72) Inventors: Michael Hollenbeck, West Jordan, UT (US); Robert Smith, West Jordan, UT (US)

(73) Assignee: Optisys, Inc., Salt Lake City, UT (US)

( * ) Notice: Subject to any disclaimer, the term of this patent is extended or adjusted under 35 U.S.C. 154(b) by 134 days.

(21) Appl. No.: 17/661,266

(22) Filed: Apr. 28, 2022

(65) Prior Publication Data

US 2022/0352615 A1 Nov. 3, 2022

Related U.S. Application Data

(60) Provisional application No. 63/180,923, filed on Apr. 28, 2021.

(51) Int. Cl.
*H01P 1/211* (2006.01)
*H01P 1/207* (2006.01)
(Continued)

(52) U.S. Cl.
CPC .............. *H01P 1/211* (2013.01); *H01P 1/207* (2013.01); *H01P 1/219* (2013.01); *H01P 3/12* (2013.01); *H01P 3/123* (2013.01); *H01P 5/18* (2013.01)

(58) Field of Classification Search
CPC ......... H01P 3/123; H01P 1/2053; H01P 1/211
(Continued)

(56) References Cited

U.S. PATENT DOCUMENTS 3,949,327 A * 4/1976 Chapell .................. H01P 1/211 333/251
4,675,631 A 6/1987 Waggett
(Continued)

FOREIGN PATENT DOCUMENTS

| | | | |
|---|---|---|---|
| EP | 1492194 | A1 | 12/2004 |
| FR | 3087954 | A1 | 10/2018 |
| WO | 2017203568 | A1 | 11/2017 |

OTHER PUBLICATIONS

Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.
(Continued)

*Primary Examiner* — Benny T Lee
(74) *Attorney, Agent, or Firm* — Terrence J. Edwards; TechLaw Ventures, PLLC

(57) ABSTRACT

Waveguide filters comprising ridges disposed within a waveguide cavity for selecting electromagnetic signals within a frequency passband. An apparatus includes a waveguide filter comprising a waveguide cavity and a plurality of ridges disposed within the waveguide cavity. The apparatus is such that each of the plurality of ridges comprises a first side and a second side, and wherein the first side and the second side are disposed at a non-orthogonal angle relative to one other. The apparatus is optimized for fabrication using metal additive manufacturing techniques.

32 Claims, 22 Drawing Sheets

(51) Int. Cl.

| | |
|---|---|
| ***H01P 1/219*** | (2006.01) |
| ***H01P 3/12*** | (2006.01) |
| ***H01P 3/123*** | (2006.01) |
| ***H01P 5/18*** | (2006.01) |

(58) Field of Classification Search

USPC .................................................. 333/211, 210

See application file for complete search history.

(56) References Cited

U.S. PATENT DOCUMENTS

| | | | | |
|---|---|---|---|---|
| 4,978,934 | A * | 12/1990 | Saad ....................... | H01P 3/123 333/241 |
| 5,528,207 | A * | 6/1996 | Ito ......................... | H01P 1/2056 333/206 |
| 6,018,315 | A | 1/2000 | Ince et al. | |
| 6,198,730 | B1 | 3/2001 | Hogberg et al. | |
| 7,280,011 | B2 * | 10/2007 | Bayar et al. .......... | H01P 11/007 333/248 |
| 9,253,925 | B1 | 2/2016 | Smith | |
| 9,960,495 | B1 | 5/2018 | Hollenbeck et al. | |
| 10,170,833 | B1 | 1/2019 | Hollenbeck et al. | |
| 10,468,773 | B2 | 11/2019 | Hollenbeck et al. | |
| 10,481,253 | B1 | 11/2019 | Hollenbeck et al. | |
| 10,680,341 | B1 | 6/2020 | Anderson et al. | |
| 2007/0290768 | A1 | 12/2007 | Rauscher | |
| 2013/0229244 | A1 | 9/2013 | Brady | |
| 2020/0127358 | A1 | 4/2020 | de Rijk et al. | |
| 2020/0161730 | A1 | 5/2020 | Hollenbeck et al. | |
| 2020/0161738 | A1 | 5/2020 | de Rijk et al. | |
| 2020/0194855 | A1 | 6/2020 | Hollenbeck et al. | |
| 2022/0352614 | A1 | 11/2022 | Hollenbeck et al. | |

OTHER PUBLICATIONS

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

ISA/US "International Search Report and Written Opinion," Received from PCT Application No. PCT/US2022/071991, Mailed Date: Oct. 6, 2022, 16 Pages.

* cited by examiner

600

600

WAVEGUIDE FILTER COMPRISING A WAVEGUIDE CAVITY DEFINED BY PLURAL SIDEWALLS AND PLURAL RIDGES, WHERE ANY GIVEN RIDGE IS ATTACHED TO A CORRESPONDING SIDEWALL

TECHNICAL FIELD

The disclosure relates generally to waveguide filters and specifically to waveguide filters comprising ridges for selecting electromagnetic signals within a desired frequency passband.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength "λ" of a desired signal frequency "f". At a particular wavelength (which is inversely proportional to the frequency by the speed of light "c" according to the equation $\lambda=c/f$) for a particular length of wire, the wire will resonate in response to being exposed to the transmitted signal in a predictable manner that makes it possible to "read" or reconstruct a received signal. For simple devices, like radio and television, a wire antenna is typically sufficient.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high-performance applications exist for antennas that are less known outside the industry, such as electronic warfare and ISR (information, surveillance, and reconnaissance.

High performance antennas are required when high data rate, long range, or high signal to noise ratios are required for a particular application. To improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length in which a signal must travel in the passive structure (total loss is loss per length multiplied by the total length), multi-piece fabrication, antenna geometry, and others. These losses are all related to specific design and fabrication choices that an antenna designer must make when balancing size, weight, power, and cost performance metrics (SWaP-C). Gain of an antenna structure is a function of the area of the antenna and the frequency of operation. To create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Every physical component is designed with the limitations of the fabrication method used to create the component. Antennas and RF components are particularly sensitive to fabrication method, as many of the critical features are inside the part, and very small changes in the geometry can lead to significant changes in antenna performance. Due to the limitations of traditional fabrication processes, hollow metal waveguide antennas and RF components have been designed to be assembled as multi-piece assemblies, with a variety of flanges, interfaces, and seams. All these junctions where the structure is assembled in a multi-piece fashion increase the size, weight, and part count of a final assembly while at the same time reducing performance through increased losses, path length, and reflections. This overall trend of increased size, weight, and part count with increased complexity of the structure have kept hollow metal waveguide antennas and RF components in the realm of applications where size, weight, and cost are less important than overall performance.

Accordingly, conventional waveguides have been manufactured using conventional subtractive manufacturing techniques which limit specific implementations for waveguides to the standard rectangular, square, and circular cross-sectional geometries that have the limitations described above. Additive manufacturing techniques provide opportunities, such as integrating waveguide structures with other RF components such that a plurality of RF components may be formed in a smaller physical device with improved overall performance. However, the process of fabricating a traditional rectangular, square, or circular waveguide structure in additive manufacturing typically leads to suboptimal performance and increased total cost in integrated waveguide structures. Novel cross-sections for waveguide structures that take advantage of the strengths of additive manufacturing will allow for improved performance of antennas and RF components while reducing total cost for a complex assembly.

It is therefore one object of this disclosure to provide waveguide filter structures that may be optimally fabricated with three-dimensional printing techniques (may alternatively be referred to as "additive manufacturing techniques"). It is a further object of this disclosure to provide waveguide filter structures that are joined to create different types of filters. It is a further object of this disclosure to provide waveguide filter structures that are integral with other RF components.

BRIEF DESCRIPTION OF THE DRAWINGS

Non-limiting and non-exhaustive implementations of the present disclosure are described with reference to the following figures, wherein like reference numerals refer to like parts throughout the detailed description and in the various views, unless otherwise specified. Advantages of the present disclosure will become better understood regarding the following description and accompanying drawings where.

DETAILED DESCRIPTION

Figure 1:
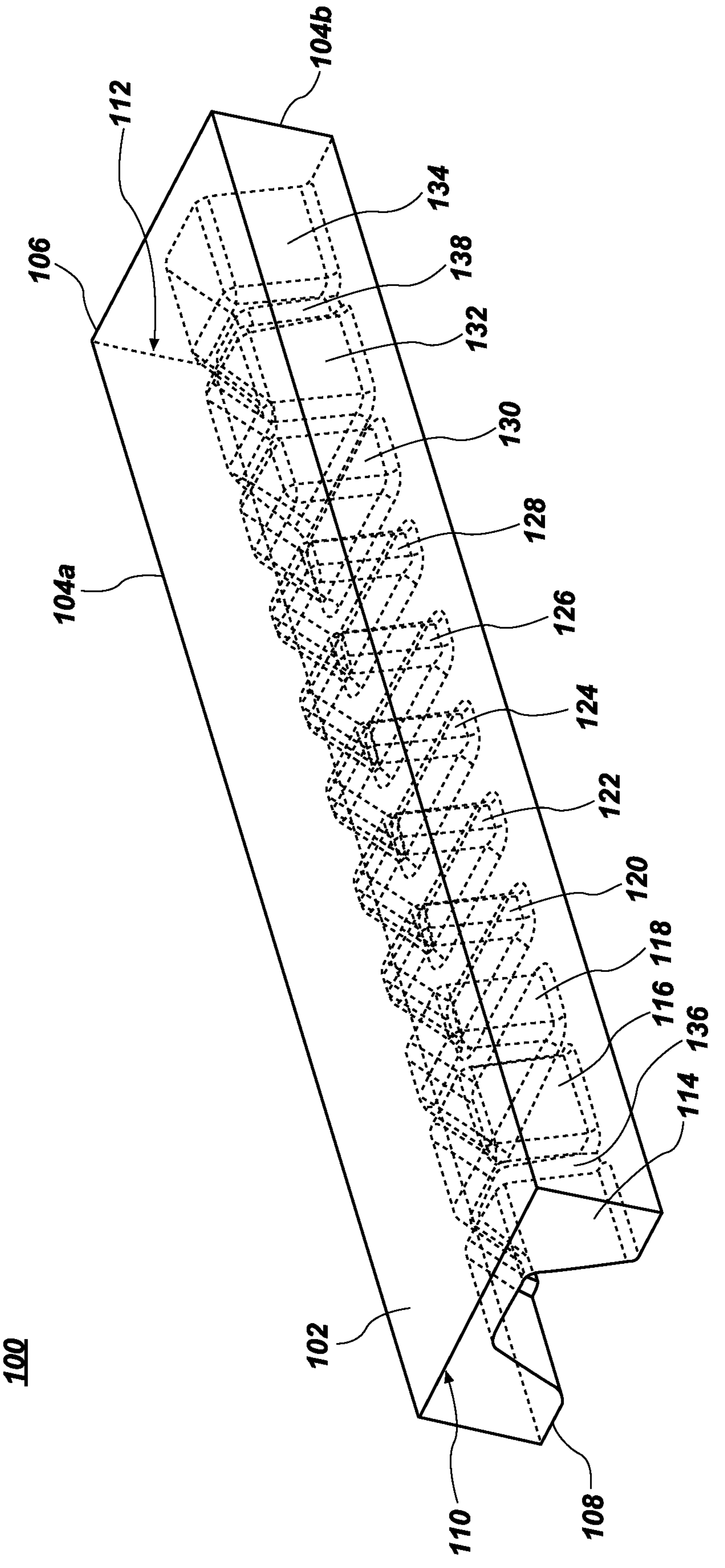
FIG. 1 illustrates a perspective view of negative space (air volume) within a quadrilateral single ridge waveguide filter comprising a plurality of ridges disposed within a waveguide cavity.

Disclosed herein are systems, methods, and devices for waveguide filters, and specifically for waveguide filters comprising ridges for selecting electromagnetic signals within a desired frequency passband. An apparatus described herein includes a waveguide filter comprising a waveguide cavity and a plurality of ridges disposed within the waveguide cavity. The apparatus is such that each of the plurality of ridges comprises a first ridge side and a ridge upper side, and wherein the first ridge side and the ridge upper side are disposed at a non-orthogonal angle relative to one other. The waveguide filters described herein are optimized for fabrication using metal additive (three-dimensional) manufacturing techniques.

In the following description, for purposes of explanation and not limitation, specific techniques and embodiments are set forth, such as particular techniques and configurations, to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether those elements are shown or described in another embodiment or figure. In other words, elements in the figures may be interchangeable between various embodiments disclosed herein, whether shown or not.

Before the structure, systems, and methods for integrated marketing are disclosed and described, it is to be understood that this disclosure is not limited to the structures, configurations, process steps, and materials disclosed herein as such structures, configurations, process steps, and materials may vary. It is also to be understood that the terminology employed herein is used for the purpose of describing embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It is also noted that many of the figures discussed herein show air volumes of various implementations of waveguides, waveguide filters, waveguide components, and/or waveguide transitions. In other words, these air volumes illustrate negative spaces of the components within a fabricated element which are created by a metal skin surrounding the fabricated element, as appropriate to implement the functionality described. It is to be understood that positive structures that create the negative space shown by the various air volumes are disclosed by the air volumes, the positive structures including a metal skin and being formed using the additive manufacturing techniques disclosed herein.

For the purposes of this detailed description, and as the detailed description relates to a metal additive manufacturing system, the direction of growth over time is called the "positive z-axis," or "zenith" while the opposite direction is the "negative z-axis" or "nadir." The nadir direction is sometimes referred to as "downward" although the orientation of the z-axis relative to gravity makes no difference in the context of this disclosure. The direction of a surface at any given point is denoted by a vector that is normal to that surface at that point. The angle between that vector and the negative z-axis is the "overhang angle," θ ("theta").

The term "downward facing surface" is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: $0° \leq \theta < 90°$. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

Referring now to the figures, FIG. 1 illustrates a perspective view of air volume defined by a waveguide filter 100. The waveguide filter 100 is an evanescent mode waveguide filter. In the figures discussed herein, structures outlined with solid lines represent negative space, or air volume. Structures outside the solid lines, and structures illustrated with dotted lines, represent solid components. The solid components discussed herein may specifically be constructed of metal.

The waveguide filter 100 includes a waveguide cavity 102 comprising a negative space (air volume) wherein an electromagnetic signal may propagate therethrough. The waveguide cavity 102 is defined by a solid metal structure built around the waveguide cavity 102. The borders of the waveguide cavity 102 are defined by a first filter sidewall 104*a* and a second filter sidewall 104*b*, wherein the second filter sidewall 104*b* is disposed opposite to the first filter sidewall 104*a*. The upper boundary of the waveguide cavity 102 is defined by an upper filter wall 106. The lower boundary of the waveguide cavity 102 is defined by a lower filter wall 108. Each of the first filter sidewall 104*a*, the second filter sidewall 104*b*, and the lower filter wall 108 is constructed of metal around the waveguide cavity 102 using metal additive manufacturing techniques. As discussed herein, the terms "side" and "wall" may be used interchangeably when discussing the boundaries of the waveguide cavity 102 and the ridges of the waveguide filter 100. Further, it should be understood that the terms "upper" and "lower" are used herein for ease of discussion only with respect to the figures and should not be seen as limiting the orientation of any structure.

The waveguide filter 100 includes a first propagation channel port 110 and a second propagation channel port 112, which are disposed opposite one another along the length of the waveguide filter 100. An electromagnetic signal may propagate through the waveguide cavity 102 in a direction beginning at the first propagation channel port 110 and exiting at the second propagation channel port 112, and vice versa. It should be appreciated that the direction of travel of the electromagnetic signal is dependent on whether the waveguide filter 100 is receiving or transmitting the electromagnetic signal. Thus, the waveguide cavity 102 can propagate a signal in either direction between the first propagation channel port 110 and the second propagation channel port 112.

The waveguide filter 100 includes a plurality of ridges 114-134 (may alternatively be referred to herein as "teeth"). Each of the ridges 114-134 is constructed of metal using metal additive manufacturing techniques. Thus, the ridges 114-134 themselves constitute a solid component, while the waveguide cavity 102 surrounding the ridges 114-134 constitutes a negative air space for propagating an electromagnetic signal around the ridges 114-134.

The quantity of ridges 114-134 within the waveguide filter 100 may vary depending on the implementation. The quantity of ridges 114-134 within the waveguide filter 100 may be optimized based on the desired frequency bandwidth of the electromagnetic signals that are allowed to propagate through the filter and the desired frequency bandwidth of the electromagnetic signals that are rejected by the filter. FIG. 1 illustrates an implementation with eleven ridges 114-134, including a first ridge 114, a second ridge 116, a third ridge 118, a fourth ridge 120, a fifth ridge 122, a sixth ridge 124, a seventh ridge 126, an eight ridge 128, a ninth ridge 130, a tenth ridge 132, and an eleventh ridge 134.

The ridges 114-134 may collectively mirror one another relative to a midpoint between the first propagation channel port 110 and the second propagation channel port 112. If the waveguide filter 100 includes an even quantity of ridges, then the ridges may mirror one another to have an equal quantity of ridges on either side of the midpoint. If the waveguide filter 100 includes an odd quantity of ridges, then the ridges may mirror one another to have a single ridge at the center point and an equal number of ridges on either side of the single ridge at the center point. In the implementation illustrated in FIG. 1, the sixth ridge 124 represents the center point, and the sixth ridge 124 is surround by the first through fifth ridges 114-122 on one side, and the seventh through eleventh ridges 126-134 on the other side.

The waveguide filter 100 includes one or more coupling ridges that enable a highly coupled connection between two ridges. The waveguide filter 100 illustrated in FIG. 1 includes a first-second coupling ridge 136 that connects the first ridge 114 to the second ridge 116. The waveguide filter 100 further includes a tenth-eleventh coupling ridge 138 that connects the tenth ridge 132 to the eleventh ridge 134. Thus, the first ridge 114 and the second ridge 116, and the tenth ridge 132 and the eleventh ridge 134, are highly coupled to one another by way of a coupling ridge. As discussed herein, "highly coupled" refers to ridges that are physically connected to another to provide electromagnetic conference between the corresponding ridges to provide a desired amount of coupled energy required for the desired filter frequency bandwidth performance.

The waveguide filter 100 may include primary ridges and secondary ridges. In the implementation illustrated in FIG. 1, the waveguide filter 100 includes four primary ridges, including the first ridge 114, the second ridge 116, the tenth ridge 132, and the eleventh ridge 134. The waveguide filter 100 further includes seven secondary ridges, including the third ridge 118, the fourth ridge 120, the fifth ridge 122, the sixth ridge 124, the seventh ridge 126, the eight ridge 128, and the ninth ridge 130. The primary ridges 114, 116, 132, 134 are connected by way of a coupling ridge to form highly coupled ridge pairs. The secondary ridges 118-130 are separated with evanescent gaps from one another and from primary ridges 116, 132 as independent discrete structures within the waveguide filter 100. Individual ridges within the waveguide filter 100 may connect to adjacent ridges through either highly coupled coupling ridges or evanescent gaps between the ridges of the waveguide filter 100. In the implementation illustrated in FIG. 1, the waveguide filter 100 includes two coupling ridges for highly coupled regions between first ridge 114 and second ridge 122, and between tenth ridge 132 and eleventh ridge 134. The waveguide filter 100 further includes 7 evanescent gaps between ridge 116 and ridge 118, between ridge 118 and ridge 120, between ridge 120 and ridge 122, between ridge 122 and ridge 124, between ridge 124 and ridge 126, between ridge 126 and ridge 128, between ridge 128 and ridge 130, and between ridge 130 and ridge 132. The evanescent gaps between ridges can be shorter or longer than shown in FIG. 1 depending on the geometry of the ridges and the desired frequency bandwidth of operation.

The waveguide filter 100 is a lowpass filter architecture, which allows electromagnetic signals having a particular frequency bandwidth of operation to pass through while rejecting all frequencies above the passband. Implementation of a lowpass filter architecture in waveguide such as that shown in waveguide cavity 102 of FIG. 1 results in filter performance that allows electromagnetic signals within a passband of frequencies to pass through the filter while rejecting frequencies above the passband for a wide rejection frequency bandwidth. The start of the passband resides above the waveguide cutoff defined by the cross-section geometry of the first propagation channel port 110 and the second propagation channel port 112. The rejection band of a lowpass filter such as that shown in FIG. 1 is significantly wider than alternative waveguide lowpass filter architectures due to higher order mode suppression enabled by evanescent gaps between ridges. For example, the waveguide filter 100 may be implemented with a passband to allow frequencies between 15 GHz and 22.5 GHz to pass through the waveguide cavity 102. This implementation will reject electromagnetic signals with a frequency below the waveguide cutoff defined by the cross-sectional geometry of the first propagation channel port 110 and the second propagation channel port 112, and electromagnetic signals with a frequency above the 22.5 GHZ start of the rejection band. In this example, the frequency range between 15 GHz and 22.5 GHz may be referred to as a passband of the lowpass filter while frequencies below the 15 GHz bottom of the passband and above the 22.5 GHz top of the passband may be referred to as a rejection band. It should be understood that the rejection increases for a wide bandwidth as the frequency of rejection is separated further from the passband.

The cross-sectional geometries, length, and positioning of ridges 116-132, length of coupling ridges 136 and 138, and length of evanescent gaps between ridges 116-132 are optimized based on the desired filter passband and rejection band. The waveguide filter 100 is optimized for a certain desired filter passband and rejection band, and this is achieved by altering the physical characteristics of one or more of the plurality of ridges 114-134, coupling ridges 136-138, and evanescent gaps between ridges 116-132. The passband and rejection band may be adjusted by changing one or more of: the distance between each of the ridges 114-134, the quantity of the ridges 114-134, the dimensions of the ridges 114-134, the lengths of the coupling ridges 136-138, the length of the evanescent gaps between ridges 116-132, and other physical changes known to those of skill in the art.

The ridges 114-134 may be implemented with sharp edges at either the convex or concave corners of the ridges. Similarly, the ridges 114-134 may be implemented with radiused edges at either the convex or concave corners of the ridges. A radiused edge is one where two lines that would intersect at a vertex have a circular or elliptical transition that rounds the intersection point rather than creating a sharp intersection point. The radiused edges eliminate sharp edges, which are difficult to fabricate using metal additive manufacturing techniques, for example due to the finite radius of the laser spot beam in a Powder Bed Fusion additive manufacturing process. Additionally, sharp edges may reduce the strength of the structure and lead to high field concentrations.

The first propagation channel port 110 and the second propagation channel port 112 are aligned about an axis defined by a straight line through the center of the waveguide filter 100. This facilitates electromagnetic propagation through the waveguide cavity 102. In practice, an electromagnetic signal may be received at the first propagation channel port 110 and propagate through the waveguide filter 100 by resonating about each of ridge 116-130. Frequencies in the rejection bands are rejected in part because the wavelengths of the rejection bands are an incorrect size to resonate about the ridges 116-130. This allows the electromagnetic signal to propagate through the waveguide filter 100 and into the eleventh ridge 134, which is also aligned about the same axis. The electromagnetic signal then exits the waveguide filter 100 through the second propagation channel port 112. The series of ridges 114-134 and coupling ridges 136-138 selects for a certain frequency passband. This ensures that the exiting electromagnetic signal (i.e., the signal that has passed through the waveguide cavity 102 and exited through the second propagation channel port 112) comprises frequencies only within the certain frequency passband.

It should be appreciated that the electromagnetic signal may propagate through the waveguide filter 100 in either direction. The electromagnetic signal may enter the waveguide filter 100 through the first propagation channel port 110 and exit the waveguide filter 100 through the second propagation channel port 112 as primarily discussed herein. However, the direction of travel may be altered depending on whether the electromagnetic signal is being received or transmitted. Thus, the electromagnetic signal may alternatively enter through the second propagation channel port 112 and exit through the first propagation channel port 110.

Figure 2:
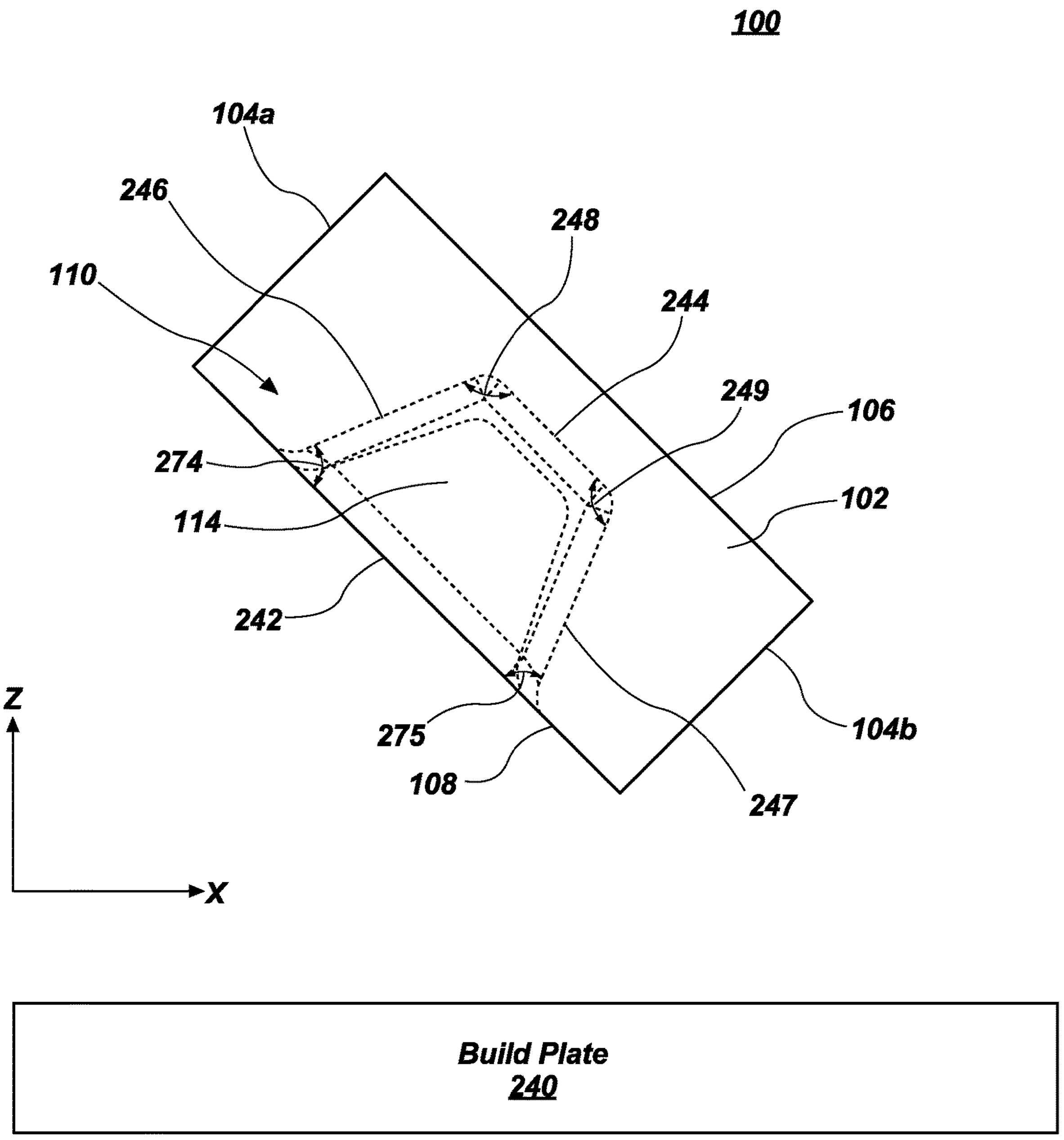
FIG. 2 illustrates a straight-on side view of a ridge disposed within a waveguide cavity of a quadrilateral single ridge waveguide filter.

FIG. 2 illustrates a straight-on side view of the waveguide filter 100. Following the same convention used in connection with other figures herein, FIG. 2 depicts the solid structure (i.e., the first ridge 114) with dotted lines and depicts the outline of negative air space (i.e., the waveguide cavity 102) with solid lines. The boundaries of the waveguide cavity 102 are defined by solid metal structures that could be a standalone filter or an indivisible component of a more complex assembly such as an antenna array. The solid metal first ridge 114 extends into the quadrilateral boundaries of the waveguide cavity 102.

The waveguide filter 100 is oriented for fabrication using metal additive manufacturing techniques relative to a build plate 240. The build plate 240 extends along the X-axis and is parallel to the X-Y plane (Y-axis orthogonal to X-Z plane). The waveguide filter 100 is fabricated in the positive Z-axis direction relative to the build plate 240. The waveguide cavity 102 extends in the Y-axis direction (i.e., into the page) and a straight-on side view of the first ridge 114 is visible.

The waveguide filter 100 may be fabricated using metal additive manufacturing techniques (i.e., three-dimensional printing using metal powder or filaments). The fabrication of the waveguide filter 100 is facilitated by orientating the waveguide filter 100 as shown in FIG. 2 with respect to the build plate 240. This prevents any overhang angle of a downward facing surface from exceeding what can be printed using metal additive manufacturing techniques. The waveguide cavity 102 may be printed layer-upon-layer, and in practice, an orientation angle of filter 100 with respect to the build plate 240 may be 45° nominally. That is, the waveguide filter 100 may be rotated by 45° in an X-Z Cartesian plane for building by additive manufacturing. The waveguide filter 100 may be rotated by between 65° and 25° in an X-Z Cartesian plane for building by additive manufacturing.

FIG. 2 specifically illustrates a straight-on side view staring down the waveguide cavity 102 with a view of the first ridge 114, but much of the disclosure presented in connection with FIG. 2 may be applied to any of the ridges 114-134 and coupling ridges 136-138 of the waveguide filter 100. The waveguide filter 100 includes the first filter sidewall 104*a*, the second filter sidewall 104*b*, the upper filter wall 106, and the lower filter wall 108 as described in connection with FIG. 1. These walls 104*a*, 104*b*, 106, 108 are constructed of metal using metal additive manufacturing techniques to form an open waveguide cavity 102. An electromagnetic signal may pass through the waveguide cavity 102 of the waveguide filter 100 by entering through the first propagation channel port 110. The first ridge 114 (and other ridges 116-134 and coupling ridges 136-138) are also constructed of metal using metal additive manufacturing techniques and extend into the waveguide cavity 102 formed by the walls 104*a*, 104*b*, 106, 108. Thus, the waveguide cavity 102 comprises a quadrilateral cross-sectional geometry, but the air space within the waveguide cavity 102 is interrupted by the solid ridges 114-134. The waveguide cavity 102 may comprise an alternative cross-sectional geometry, such as a hexagonal or irregular hexagonal cross-sectional geometry and may include one or more complex sides.

The first ridge 114 includes a ridge base 242 and a ridge upper side 244. The first ridge 114 further includes a first ridge side 246 and a second ridge side 247. The first ridge side 246 and the second ridge side 247 may comprise equivalent or nearly equivalent lengths and may mirror one another as shown in FIG. 2. The ridge base 242 may comprise a longer length than the ridge upper side 244. The ridge base 242 is attached to and forms an indivisible component of the lower filter wall 108. The ridge base 242 may be indivisibly formed in connection with the lower filter wall 108 layer-by-layer during a metal additive manufacturing process. This configuration results in the first ridge 114 comprising a quadrilateral geometry, and specifically comprising a trapezoidal geometry.

The first ridge 114 does not comprise a perfect rectangular or square geometry. The first ridge 114 includes at least one internal angle that is non-orthogonal (i.e., not equal to 90°). The first ridge 114 includes a first-upper angle 248 that is internal to the quadrilateral geometry and measured relative to the first ridge side 246 and the ridge upper side 244. The first ridge 114 includes a second-upper angle 249 that is internal to the trapezoidal geometry and measured relative to the second ridge side 247 and the ridge upper side 244. The first-upper angle 248 and the second-upper angle 249 are greater than 90°. The first-upper angle 248 and the second-upper angle 249 may be equivalent or nearly equivalent to one another. The first ridge 114 includes a first-base angle 274 that is internal to the quadrilateral geometry and measured relative to the first ridge side 246 and the ridge base 242. The first ridge 114 includes a second-base angle 275 that is internal to the quadrilateral geometry and measured relative to the second ridge side 247 and the ridge base 242. The first-base angle 274 and the second-base angle 275 are less than 90°. The first-base angle 274 and the second-base angle 275 may be equivalent or nearly equivalent to one another.

It should be appreciated that the naming conventions used herein for the angles 248, 249, 274, 275 and sides 242, 244, 246, 247 of the ridge 114-134 and coupling ridges 136-138 are for ease of discussion only and should not be seen as limiting. For example, reference to "a first side and a second side connected to the first side" may refer to any two sides 242, 244, 246, 247 of the cross-sectional geometry of the ridges 114, 134 that are connected to one another, including any of the following combinations: the first ridge side 246 and the ridge upper side 244; the second ridge side 247 and the ridge upper side 244; the first ridge side 246 and the ridge base 242; and the second ridge side 247 and the ridge base 242.

Figure 3A:
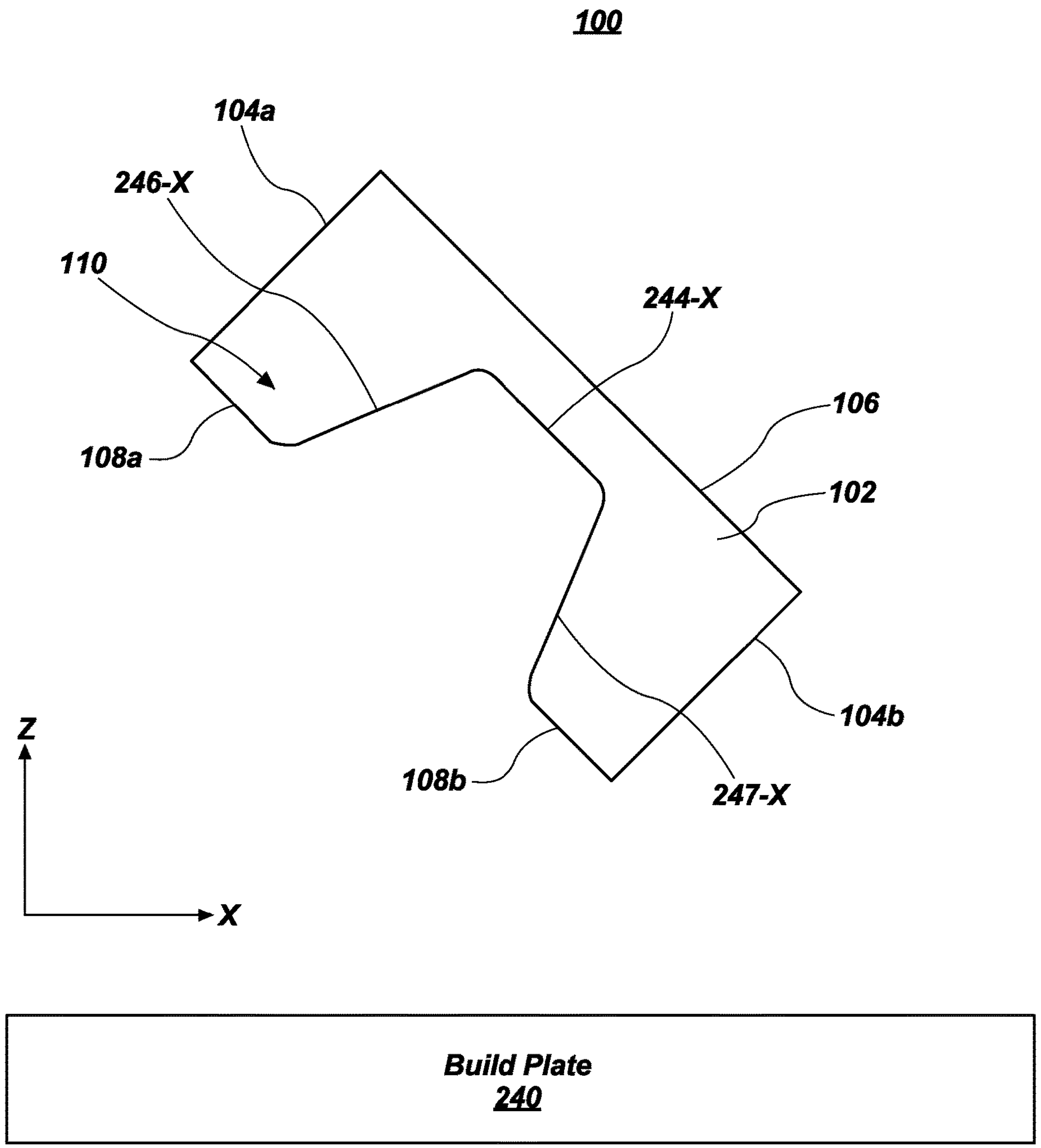
FIG. 3A illustrates a straight-on cross-sectional side view of an air volume of a quadrilateral waveguide cavity comprising a complex side, wherein at least a portion of the sidewalls defining the waveguide cavity meet at sharp edges.
Figure 3B:
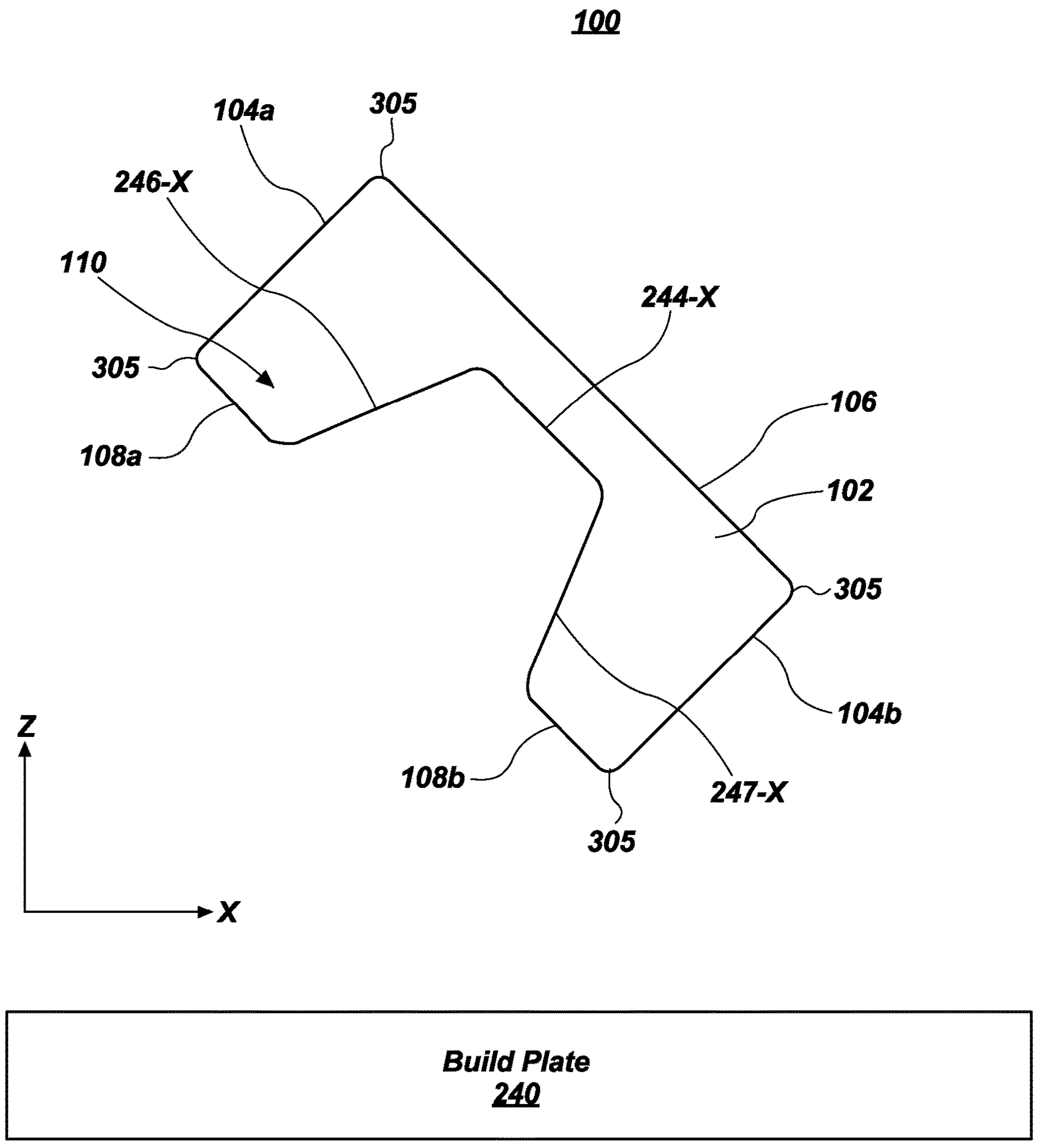
FIG. 3B illustrates a straight-on cross-sectional side view of an air volume of a quadrilateral waveguide cavity comprising a complex side, wherein the sidewalls defining the waveguide cavity meet at radiused edges.

FIGS. 3A and 3B each illustrate a straight-on cross-sectional side view of the waveguide cavity 102 at a point along a length of the waveguide cavity 102 wherein a ridge 114-134 is attached to a sidewall of the waveguide cavity 102. FIG. 3A specifically illustrates an implementation wherein at least a portion of the sidewalls defining the waveguide cavity 102 meet at sharp corners. FIG. 3B specifically illustrates an implementation wherein the sidewalls defining the waveguide cavity meet at radiused corners. The waveguide cavity 102 is oriented for additive manufacturing relative to the build plate 240. The build plate 240 extends along the X-axis and is parallel to the X-Y plane (Y-axis orthogonal to X-Z plane). The waveguide filter 100 is fabricated in the positive Z-axis direction relative to the build plate 240. The waveguide cavity 102 extends in the Y-axis direction (i.e., into the page). In contrast with FIG. 2, which illustrates the solid structure of the first ridge 114, FIGS. 3A and 3B illustrate the cross-sectional geometry of the negative air space of the waveguide cavity 102 where the first ridge 114 (or any other ridge 114-134) extends into the waveguide cavity 102. In FIGS. 3A and 3B, the regions associated with the first ridge 114 that cut into the air volume of the waveguide filter 100 are denoted with an "-X" to indicate that the first ridge 114 itself is not illustrated in FIGS. 3A and 3B, but that the boundaries defined by the first ridge 114 are altering the geometry of the waveguide cavity 102.

The waveguide cavity 102 is defined by the quadrilateral geometry comprising the first filter sidewall 104*a*, the second filter sidewall 104*b*, the upper filter wall 106, and the lower filter wall 108 as shown in FIG. 1. The cross-sectional geometry of the air volume within the waveguide cavity 102 is further defined by the boundaries of the ridges 114-134 and coupling ridges 136, 138. FIGS. 3A and 3B illustrate that the waveguide cavity 102 comprises a complex cross-sectional geometry wherein the boundary of the first ridge side 246-X, the boundary of the second ridge side 247-X, and the boundary of the ridge upper side 244-X extend into the waveguide cavity 102.

The waveguide cavity 102 comprises a quadrilateral cross-sectional geometry with a complex side. In FIGS. 3A and 3B, the lower filter wall (see callout 108 first described in connection with FIG. 1) is a complex side because the length of the lower filter wall is altered by the ridge that extends into the quadrilateral space of the waveguide cavity 102. In the implementations described herein, any side of the waveguide cavity 102 that comprises a ridge 114-134 and coupling ridges 136, 138 attached thereto may be referred to as a "complex side." The waveguide cavity 100 illustrated in FIGS. 3A and 3B includes the one complex side that includes each of a first portion 108*a* of the lower filter wall (see callout 108 first described in connection with FIG. 1), and a second portion 108*b* of the lower filter wall (see callout 108 first described in connection with FIG. 1). The complex side further includes the boundary of the first ridge side 246-X, the boundary of the ridge upper side 244-X, and the boundary of the second ridge side 247-X. The complex side of the waveguide cavity 102 (i.e., the combination of the first portion 108*a*, the second portion 108*b*, the boundary of the first ridge side 246-X, the boundary of the ridge upper side 244-X, and the boundary of the second ridge side 247-X) is considered a single side of the quadrilateral cross-sectional geometry of the waveguide cavity 102.

The waveguide filter 100 is manufactured using metal additive manufacturing techniques. Metal additive manufacturing is a fabrication method that allows for complex integrated structures to be fabricated as a single part. However, one unique aspect of metal additive manufacturing, is these complex integrated structures are fabricated as layers indivisibly laid on top of other layers of metal. Thus, orientation, or layer printing order, of an entire part or indivisible assembly of parts must be considered to ensure that the hollow waveguide cavity 102 of the waveguide filter 100, or other structure, may be formed within an integrated structure without additional build support internal to the waveguide cavity 102. In other words, during metal additive manufacturing, only a first layer of metal may be printed without having another layer underneath the first layer preferably in a positive Z-axis direction (e.g., from approximately 0° to approximately 90° to the X-Y plane). This is possible by printing on to a build plate 240 to support the build of a structure in, preferably, a positive Z-axis direction.

Further, another constraint of metal additive manufacturing is that a metal layer must be printed with a minimal overhang, based in part on laser spot diameter, on to another layer of metal (or build substrate in the case of the first metal layer). Overhang of an individual metal layer comprises the distance that an amount of solid metal material extends beyond material which has supporting material in the layer directly beneath the individual metal layer in the z-axis. When manufacturing the waveguide filter 100 using additive manufacturing techniques, each individual layer of metal (or other material) requires minimal overhang for successful fabrication. The aggregate minimal overhang of each layer may be cascaded over multiple layers to create a downward-facing surface comprising an overhang angle.

In one example, a rectangular waveguide may have four sides, including a bottom, two vertical sides, and a top. Printing a rectangular waveguide, however, presents difficulties because, while the bottom and vertical sides may be easily printed, the upper side of the rectangular waveguide must be printed without a layer of material underneath the majority of the surface, referred to as an "unsupported surface". Thus, any new layer has no metal layer overhang on which to print an upper side of the rectangular waveguide. To print a top surface, at least some overhang from a previous layer must extend, with a maximum single layer minimal overhang based on laser spot diameter, across a gap between the vertical sides of the rectangular waveguide to eventually join the vertical sides with an upper side. While some minimal overhang on each individual layer can be tolerated, an extended overhang length with overhang angle of 0°, or a right-angle, as in a rectangular waveguide, typically leads to mechanical defects or requires internal support structures to fabricate.

Thus, minimal single layer overhang and downward facing surface overhang angles are an important consideration when fabricating a waveguide using metal additive manufacturing techniques. Overhang angles of a downward facing surface at or near 0° can produce significant mechanical defects. Such overhang angles tend to occur where one or more walls of a component encounter a significant transition (e.g., an overhang angle approaching 0°) in the build direction, which results in an extended overhang of unsupported material on one or more individual layers. This unsupported material is exposed to high stresses in the build process and has high potential to deform or break. Therefore, it is desirable to maintain the minimum overhang angles of downward facing surfaces within an air volume of a printed structure within a prescribed range of 45°+/−20° through selective component shaping and build orientation during manufacturing. In some cases, it is desirable to maintain the overhang angles between 25° and 89°.

As shown in FIGS. 3A and 3B, the waveguide cavity 102 is illustrated for construction relative to the build plate 240 by additive manufacturing techniques, such as three-dimensional printing using metal, such as a metal powder or filament. Construction of the waveguide filter 100 may be facilitated by the orienting of the waveguide filter 100 as shown with respect to the build plate 240 to keep an overhang angle of any downward facing surface from exceeding what can be printed. For example, as shown in FIGS. 3A and 3B, the walls 104*a*, 104*b*, 106, 108*a*, 108*b* that define the negative space of the waveguide cavity 102 may be printed layer-upon-layer while always having a previous layer on which a subsequent layer may be built with minimal overhang (apart from the first layer printed) such that the aggregate of multiple individual layers produces a downward facing surface with a manufacturable overhang angle.

In practice, an optimal minimum overhang angle for a downward facing surface may be 45° nominally but may be between 25° and 89°. That is, the waveguide filter 100 may be rotated by optimally 45° (or between 25° and 65°) in an X-Z Cartesian plane for building by additive manufacturing to ensure walls 104*a* and 106, oriented as downward facing surfaces in FIGS. 3A and 3B, maintain a desired overhang angle during build. In another embodiment, the waveguide filter 100 may be rotated by between 65° and 25° in an X-Z Cartesian plane for building by additive manufacturing.

The waveguide cavity 102 is defined by the sidewalls 104*a*, 104*b*, 106, 108*a*, 108*b* forming the quadrilateral cross-sectional geometry with the complex side. The sidewalls defining the waveguide cavity 102 may meet at sharp corners or radiused corners. In FIG. 3A, the sidewalls 104*a*, 106, 104*b*, 108*a*, 108*b* that define the air volume of the waveguide cavity 102 meet at sharp corners. In FIG. 3B, the sidewalls 104*a*, 106, 104*b*, 108*a*, 108*b* that define the air volume of the waveguide cavity 102 meet at radiused corners 305. The curvature of the radiused corners 305 is optimized for fabricating the waveguide filter 100 using metal additive manufacturing techniques.

Figure 4:
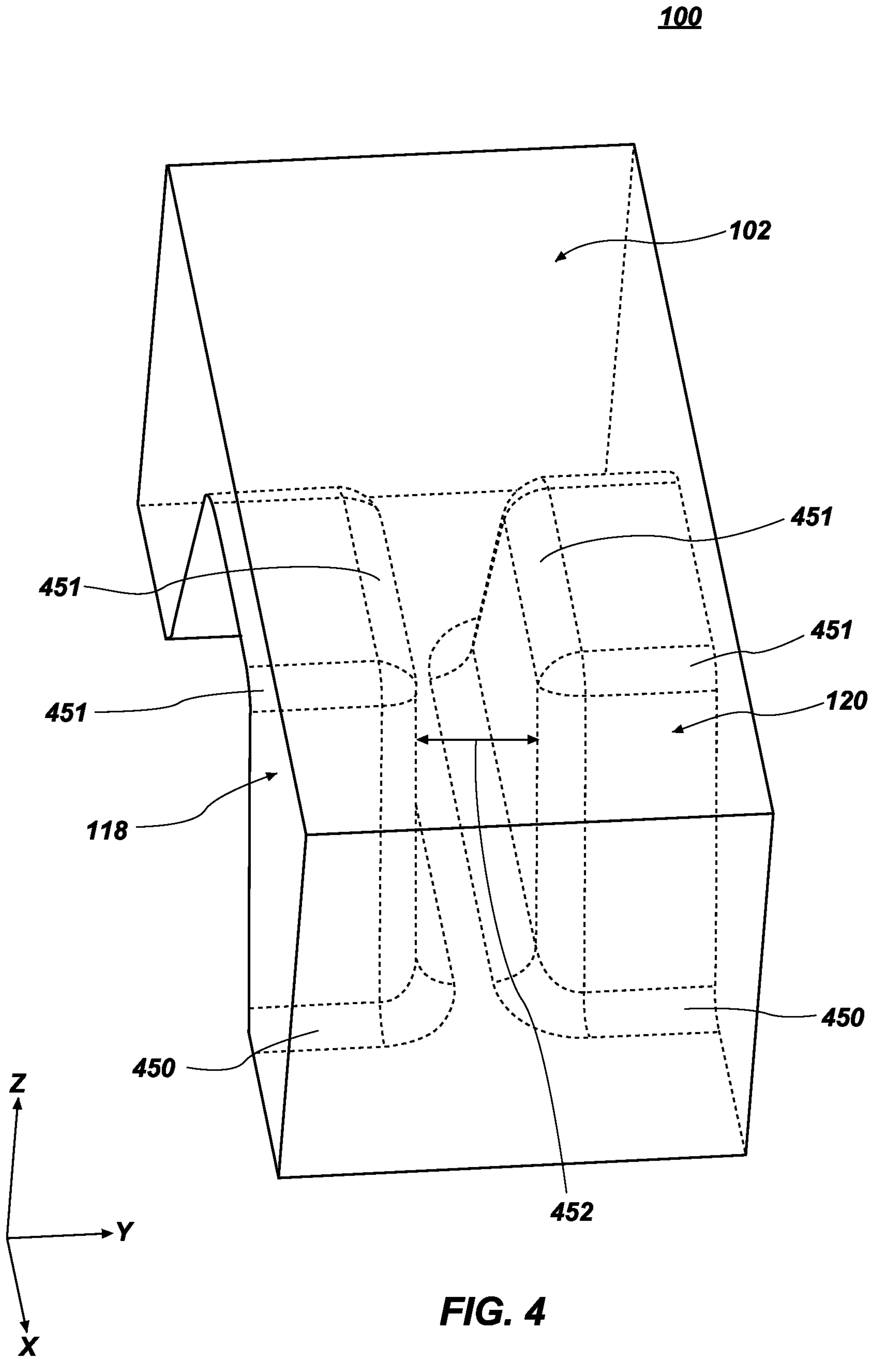
FIG. 4 illustrates a perspective view of a portion of a quadrilateral single ridge waveguide filter comprising two ridges with an evanescent gap disposed between them.

FIG. 4 illustrates a perspective view of a portion of the waveguide filter 100, and specifically illustrates a perspective view of portions of the third ridge 118 and the fourth ridge 120. Consistent with the conventions used in other figures herein, the boundary of negative space (air volume) is illustrated with solid lines, and solid components within the negative space are illustrated with dotted lines.

The secondary ridges 118-130 are disposed within the waveguide filter 100 with evanescent gaps in between one another. Thus, the secondary ridges 118-130 are not highly coupled to one another. This is in contrast with the first ridge 114 and the second ridge 116 that are highly coupled to one another by way of the first-second coupling ridge 136; and the tenth ridge 132 and the eleventh ridge 134 that are highly coupled to one another by way of the tenth-eleventh coupling ridge 138. FIG. 4 illustrates the evanescent gap 452 between the third ridge 118 and the fourth ridge 120. Each of the evanescent gaps 452 within the waveguide filter 100 (i.e., between two of the secondary ridges 118-130, and between ridges 116-118 and between ridges 130-132) may comprise equivalent or entirely different dimensions. The third ridge 118 and fourth ridge 120 are illustrated for exemplary purposes only, and the evanescent gap 452 may be the same or may be different between any two ridges 116-132 of the waveguide filter 100. In a typical implementation of filter 100 evanescent gaps 452 between second ridge 116 and third ridge 118 will be equivalent to evanescent gap 452 between ninth ridge 130 and tenth ridge 132. Similarly evanescent gaps 452 between ridges 118-120 and between ridges 128-130 are equivalent, evanescent gaps between ridges 120-122 and between ridges 126-128 are equivalent, between ridges 122-124 and between ridges 124-126 are equivalent, and each of the stated evanescent gaps 452 may be different from one another. In one implementation all evanescent gaps 452 may be different from all other evanescent gaps 452.

In various implementations and depending on the desired frequency passband and frequency rejection band, the lengths of each of the ridges and evanescent gaps may be unique and optimized to achieve a certain performance over the desired frequency passband and frequency rejection band. The lengths of two or more of the ridges and evanescent gaps may be equivalent in some cases, but this is not required, and is dependent on the intended use-case. The waveguide filter 100 may be designed such that there is symmetry about the center of the filter.

The evanescent gap 452 is the distance between any adjacent two ridges 116-132. The evanescent gap 452 constitutes negative space, or air volume, within the waveguide cavity 102. The length of the evanescent gap 452 may change from a bottom end of the ridges up to the top ends of the ridges depending on the geometry of the ridges themselves. The dimensions of the evanescent gaps 452 may be adjusted to change performance characteristics of the waveguide filter 100, such as frequency passband, rejection band, and other performance characteristics.

The coupling of the ridges 114-134 within the waveguide filter 100 is optimized depending on the desired frequency passband. In some implementations, all ridges 114-134 within the waveguide filter 110 may be highly coupled to other ridges, and in other implementation, all ridges 114-134 within the waveguide filter 110 may comprise "low coupling," or may comprise an evanescent gap 452 as shown in FIG. 4. The pairs of ridges 114-134 may have any combination of high coupling or low coupling depending on the desired outcome.

The ridges 114-134, including the third ridge 118 and the fourth ridge 120 illustrated in FIG. 4, comprise a plurality of radiused edges 450, 451. The radiused edges 450, 451 increase mechanical strength of the ridges 114-134 and facilitate manufacturing the ridges 114-134 using metal additive manufacturing techniques. The ridges 114-134 include concave radiused edges 450 and convex radiused edges 451.

Figure 5:
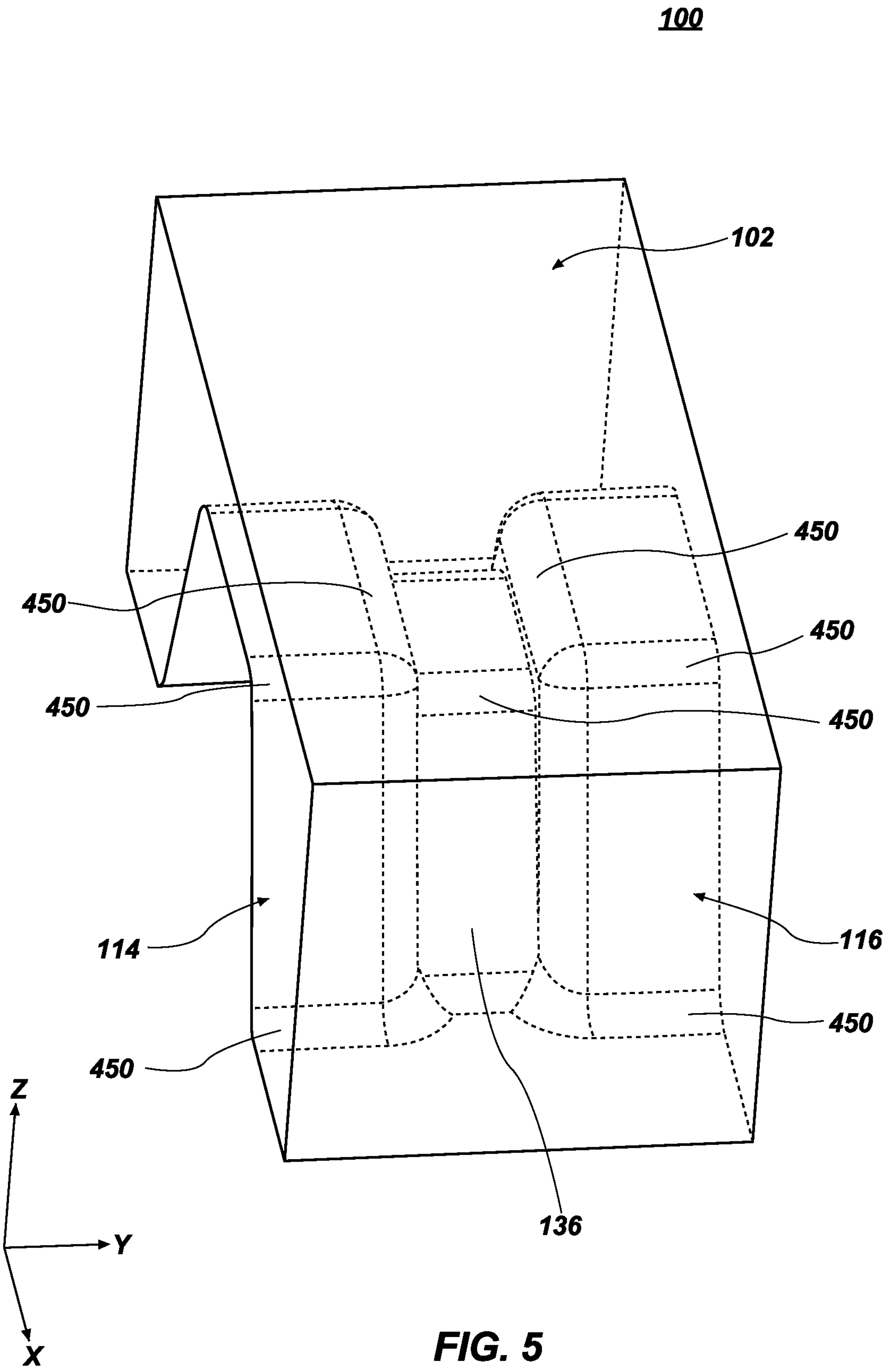
FIG. 5 illustrates a perspective view of a portion of a quadrilateral single ridge waveguide filter comprising two highly coupled ridges with a coupling ridge disposed between them.

FIG. 5 illustrates a perspective view of a portion of the waveguide filter 100, and specifically illustrates a perspective view of portions of the first ridge 114 and the second ridge 116. Consistent with the conventions used in other figures herein, the boundary of negative space (air volume) is illustrated with solid lines, and solid components within the negative space are illustrated with dotted lines.

The first ridge 114 and the second ridge 116 are highly coupled to one another by way of the first-second coupling ridge 136. Similarly, the tenth ridge 132 and the eleventh ridge 134 are highly coupled to one another by way of the tenth-eleventh coupling ridge 138 (not pictured in FIG. 5). The spacing between the first ridge 114 and the second ridge 116 may be optimized for desired performance characteristics of the waveguide filter 100.

The ridges 114-134 include radiused edges 450, 451 to facilitate manufacturing with additive manufacturing techniques. Additionally, the coupling ridges 136, 138 include one or more concave radiused edges 450 and convex radiused edges to facilitate manufacturing with additive manufacturing techniques. The dimensions of the coupling ridges may be adjusted to change performance characteristics of the waveguide filter 100, such as frequency passband, rejection band, and other performance characteristics. The lengths of coupling ridges may be equal in one implementation. In a separate implementation the lengths of coupling ridges are different.

Figure 6A:
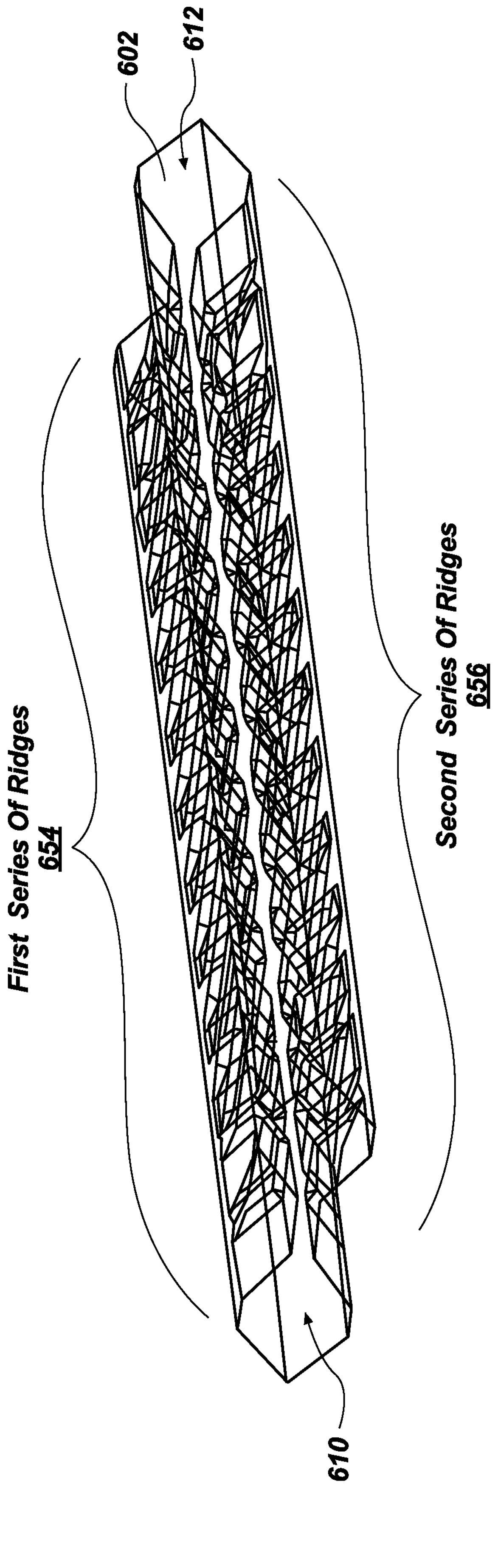
FIGS. 6A and 6B illustrate a perspective view of an air volume within a hexagonal dual ridge waveguide filter comprising a plurality of ridges posed within a waveguide cavity.
Figure 6B:
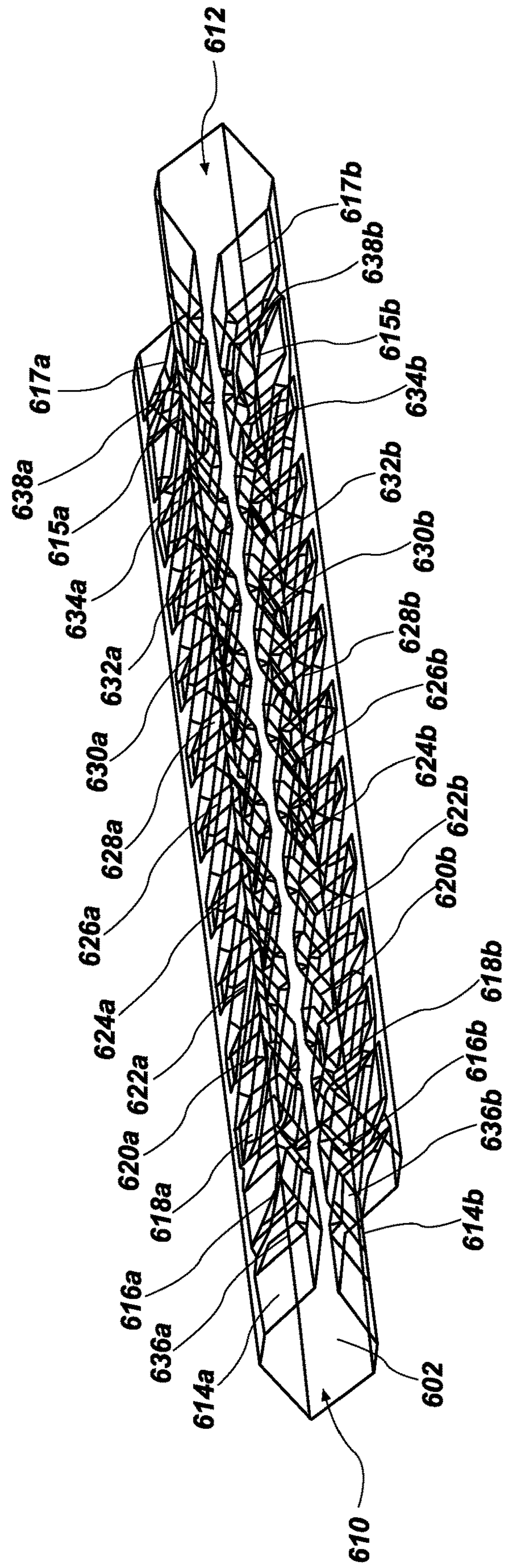

FIGS. 6A and 6B illustrate perspective views of air volume of a waveguide filter 600. The waveguide filter 600 is an irregular hexagonal evanescent mode dual-ridge waveguide filter. The waveguide filter 600 comprises a waveguide cavity 602, which is the negative space (air volume) configured to propagate an electromagnetic signal. The waveguide cavity 602 comprises an irregular hexagonal cross-sectional geometry, where the first propagation channel port 610 and second propagation channel 612 comprise an irregular hexagonal cross section with complex sides. The waveguide filter 600 includes similar features and components as described in connection with the waveguide filter 100, with the waveguide filter 100 comprising a quadrilateral cross-sectional geometry and the waveguide filter 600 comprising an irregular hexagonal cross-sectional geometry with complex sides.

The waveguide cavity 602 is a negative space configured to propagate an electromagnetic signal from a first propagation channel port 610 to a second propagation channel port 612. It should be appreciated that the electromagnetic signal may instead propagate from the second propagation channel port 612 to the first propagation channel port 610 depending on whether the electromagnetic signal is being received or transmitted.

The waveguide filter 600 comprises a plurality of ridges that serve as components of a low-pass filter of electromagnetic signals. The series of ridges allow electromagnetic signals with certain frequencies to pass and exit through the second propagation channel port 612 (or the first propagation channel port 610, depending on the direction of travel). The series of ridges further prevent electromagnetic signals with other frequencies from propagating through waveguide filter 600.

The waveguide filter 600 is a dual-ridge waveguide filter, meaning the waveguide filter 600 comprises a first series of ridges 654 and a second series of ridges 656 as shown in FIG. 6A. This is in contrast with the waveguide filter 100 first illustrated in FIG. 1, which has a single series of ridges 114-134 and coupling ridges 136-138. The ridges of the waveguide filter 600 may comprise similar characteristics to those discussed in connection with the waveguide filter 100, but with adjusted shapes and dimensions to accommodate the irregular hexagonal cross-sectional geometry with complex sides of the waveguide cavity 602.

Each of the first series of ridges 654 and the second series of ridges 656 as shown in FIG. 6A includes thirteen ridges in the example illustrated in FIGS. 6A-6B, although it should be appreciated that the waveguide filter 600 may include any number of ridges as needed based on the desired performance characteristics. As shown in FIG. 6B, the first series of ridges 654 includes a first ridge 614*a*, a second ridge 616*a*, a third ridge 618*a*, a fourth ridge 620*a*, a fifth ridge 622*a*, a sixth ridge 624*a*, a seventh ridge 626*a*, an eight ridge 628*a*, a ninth ridge 630*a*, a tenth ridge 632*a*, an eleventh ridge 634*a*, a twelfth ridge 615*a*, and a thirteenth ridge 617*a*. The first ridge 614*a* and the second ridge 616*a* are highly coupled to one another by way of a first coupling ridge 636*a*. The twelfth ridge 615*a* and the thirteenth ridge 617*a* are highly coupled to one another by way of a second coupling ridge 638*a*. The second series of ridges 656 as shown in FIG. 6A includes a first ridge 614*b*, a second ridge 616*b*, a third ridge 618*b*, a fourth ridge 620*b*, a fifth ridge 622*b*, a sixth ridge 624*b*, a seventh ridge 626*b*, an eight ridge 628*b*, a ninth ridge 630*b*, a tenth ridge 632*b*, an eleventh ridge 634*b*, a twelfth ridge 615*b*, and a thirteenth ridge 617*b*. The first ridge 614*b* and the second ridge 616*b* are highly coupled to one another by way of a first coupling ridge 636*b*. The twelfth ridge 615*b* and the thirteenth ridge 617*b* are highly coupled to one another by way of a second coupling ridge 638*b*.

The first series of ridges 654 and the second series of ridges 656 as shown in FIG. 6A may mirror one another. Each of the first series of ridges 654 and the second series of ridges 656 as shown in FIG. 6A may include pairs of ridges that are highly coupled to one another, such as the first ridge 114 and second ridge 116, and the tenth ridge 132 and eleventh ridge 134 of the waveguide filter 100 first illustrated in FIG. 1. The highly coupled ridge pairs may be connected by a coupling ridge, such as the coupling ridges 136, 138 discussed in connection with the waveguide filter 100. Each of the first series of ridges 654 and the second series of ridges 656 as shown in FIG. 6A may additionally include ridges that are not highly coupled, such as the secondary ridges 118-130 of the waveguide filter 100.

The waveguide filter 600 is a lowpass filter architecture which allows electromagnetic signals having a particular frequency bandwidth of operation to pass through the filter while rejecting all frequencies above the passband. Implementation of a lowpass filter architecture in waveguide such as that shown in waveguide cavity 602 of FIGS. 6A-6B results in filter performance that allows electromagnetic signals within a passband of frequencies to pass through the filter while rejecting frequencies above the passband for a wide rejection frequency bandwidth. The start of the passband resides above the waveguide cutoff defined by the cross-section geometry of first propagation channel port 610 and second propagation channel port 612. The rejection band of a lowpass filter such as that shown in FIGS. 6A-6B is significantly wider than alternative waveguide lowpass filter architectures due to higher order mode suppression enabled by evanescent gaps between ridges. For example, the waveguide filter 600 may be implemented with a passband to allow frequencies between 15 GHz and 22.5 GHz to pass through the waveguide cavity 602. This implementation will reject electromagnetic signals with a frequency below the waveguide cutoff defined by the cross-sectional geometry of first propagation channel port 610 and second propagation channel port 612, and electromagnetic signals with a frequency above the 22.5 GHz start of the rejection band. In this example, the frequency range between 15 GHz and 22.5 GHz may be referred to as a "passband of the lowpass filter" while frequencies below the 15 GHz bottom of the passband and above the 22.5 GHz top of the passband may be referred to as a "rejection band". It should be understood that the rejection increases for a wide bandwidth as the frequency of rejection is separated further from the passband.

Performance characteristics of the waveguide filter 600 are determined by the cross-sectional geometry and length of each of the ridges and the length of each of the coupling ridges or evanescent gaps of the first series of ridges 654 and the ridges of the second series of ridges 656 as shown in FIG. 6A. The passband and rejection band may be adjusted by changing the length of each of the ridges, the length of each of the coupling ridges, or the length of the evanescent gaps between each of the ridges in the first series of ridges 654 and/or the second series of ridges 656 as shown in FIG. 6A. The quantity of ridges may be adjusted, the dimensions of the ridges may be adjusted, the size of the evanescent gaps between ridges may be adjusted, and other physical changes may be made to the ridges to optimize performance of the waveguide filter 600.

Like the waveguide filter 100 first illustrated in FIG. 1, any of the ridges of the waveguide filter 600 may be implemented with concave or convex radiused edges. The concave radiused edges eliminate sharp edges, which are difficult to fabricate using metal additive manufacturing techniques. Additionally, sharp edges reduce the strength of the structure and lead to high field concentrations.

The waveguide filter 600 may be constructed such that the first series of ridges 654 mirrors the second series of ridges 656 extending along the longitudinal axis of the waveguide filter 600 and bisecting through the center of first propagation channel port 610 (which is also the direction of travel of an electromagnetic signal along the waveguide cavity 602). For example, if the first series of ridges 654 comprises eleven ridges like the waveguide filter 100 first illustrated in FIG. 1, then the second series of ridges 656 as shown in FIG. 6A may also comprise eleven ridges with identical or nearly identical dimensions and geometries. It should be appreciated that the waveguide filter 600 may include any suitable number of ridges, including an odd quantity of ridges or an even quantity of ridges, based on desired performance characteristics.

Figure 7:
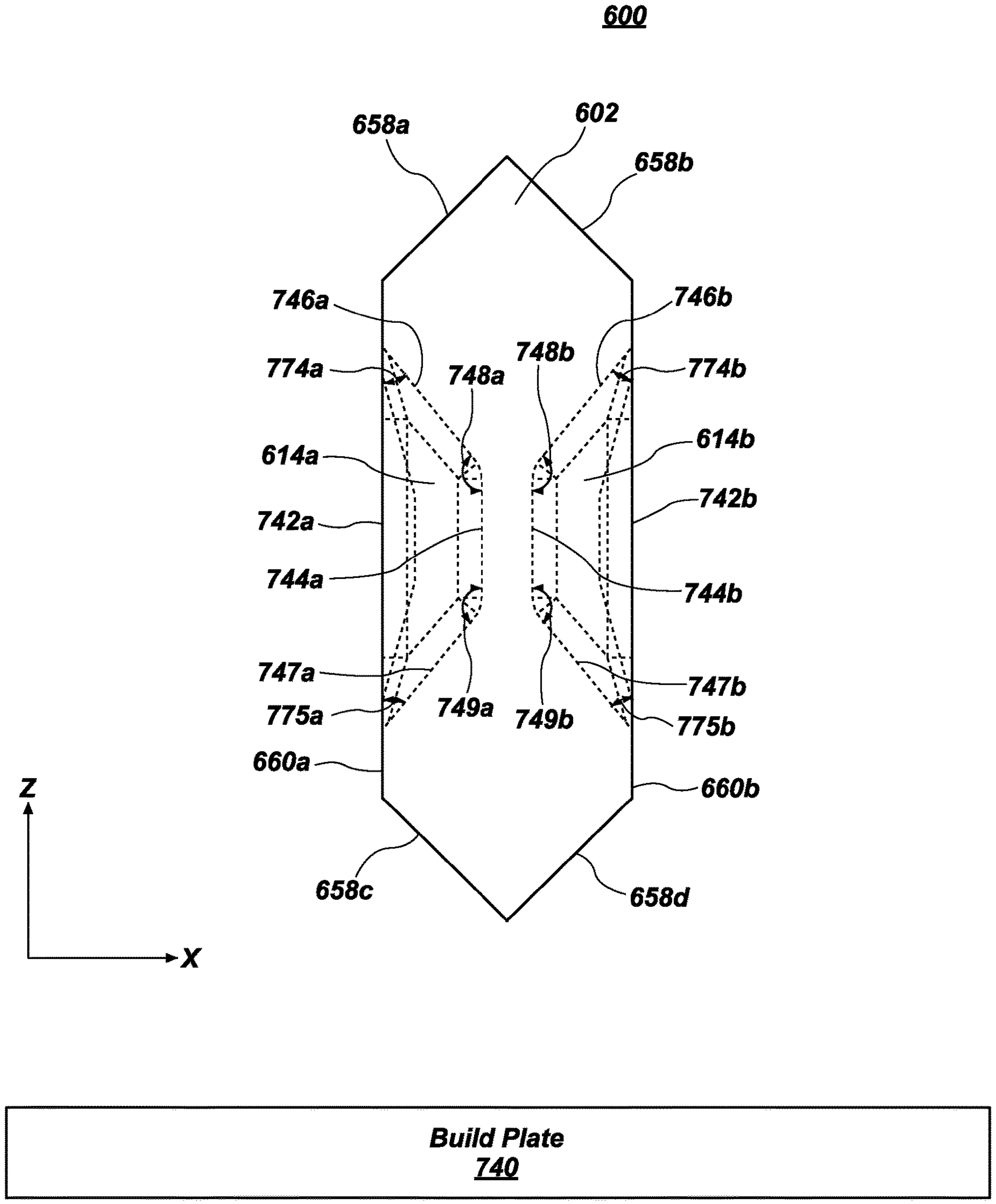
FIG. 7 illustrates a straight-on side view of a ridge disposed within a hexagonal waveguide cavity of a hexagonal dual ridge waveguide filter.

FIG. 7 illustrates a straight-on side view of the waveguide filter 600. Following the same convention used in connection with other figures herein, FIG. 7 depicts the solid structures (i.e., a first ridge 614*a* of the first series of ridges 654 and a first ridge 614*b* of the second series of ridges 656 as shown in FIGS. 6A and 6B) with dotted lines and depicts the outline of negative air space (i.e., the waveguide cavity 602) with solid lines. The boundaries of the waveguide cavity 602 are defined by solid metal structures that could be a standalone filter or an indivisible component of a more complex assembly such as an antenna array. The solid metal first ridge 614*a* extends into the hexagonal boundaries of the waveguide cavity 602.

The waveguide filter 600 is oriented for fabrication using metal additive manufacturing techniques relative to a build plate 740. The build plate 740 extends along the X-Y plane and the waveguide filter 600 is fabricated in the positive Z-axis direction relative to the build plate 740. The waveguide cavity 602 extends in the Y-axis direction (i.e., into the page) and a straight-on side view of the first ridge 614 is visible.

The waveguide filter 600 may be fabricated using metal additive manufacturing techniques (i.e., three-dimensional printing using metal powder or filaments). The fabrication of the waveguide filter 600 is facilitated by orientating the waveguide filter 600 as shown in FIG. 7 with respect to the build plate 740. This prevents any overhang angle of a downward facing surface from exceeding what can be printed using metal additive manufacturing techniques. The waveguide cavity 602 may be printed layer-upon-layer, and in practice, the waveguide cavity 602 may be oriented such that all overhang angles may be 45° nominally or more. That is, the waveguide filter 600 may be oriented in an X-Z Cartesian plane for building by additive manufacturing such that overhang angles of waveguide walls 658*a* and 658*b*, and ridge walls 747*a* and 747*b* are nominally 45°. The waveguide filter 600 may be oriented such that overhang angles are between 65° and 25° in an X-Z Cartesian plane for building by additive manufacturing. The waveguide filter 600 may have downward facing surfaces, such as waveguide walls 658*a* and 658*b*, or ridge walls 747*a* and 747*b*, designed such that the resulting overhang angle in a desired build orientation is greater than 25°.

FIG. 7 specifically illustrates a straight-on side view staring down the waveguide cavity 602 with a view of a first ridge 614*a* of the first series of ridges 654 and a first ridge 614*b* of the second series of ridges (see callout 656 as first discussed in connection with FIG. 6A). Much of the disclosure presented in connection with FIG. 7 may be applied to any of the ridges of the first series of ridges 654 and the second series of ridges 656 of the waveguide filter 600 as shown in FIG. 6A.

The waveguide filter 600 includes an irregular hexagonal cross-sectional geometry with two complex sides. The waveguide filter 600 includes a first side 658*a* and a second side 658*b* which are symmetrical with identical lengths. The waveguide filter 600 further includes a third side 658*c* and a fourth side 658*d* which are symmetrical with identical lengths. As shown in FIG. 7, each of sides 658*a*-658*d* are symmetrical with identical lengths. However, the sides 658*a*-658*d* need not be symmetrical or have identical lengths. Each of the sides 658*a*-658*d* may have different lengths or some of the sides 658*a*-658*d* may have similar lengths while others of the sides 658*a*-658*d* may have different lengths.

The waveguide filter 600 is referred to as having an irregular hexagonal cross-sectional geometry with complex sides because the fifth side 660*a* and the sixth side 660*b* each have a length that is different from the sides 658*a*-658*d* and include a ridge. As shown in FIG. 7, the fifth side 660*a* and the sixth side 660*b* have a same length that is longer than a length of sides 658*a*-658*d*. Although, it is conceivable, that the fifth side 660*a* and the sixth side 660*b* may have a length that is the same as or shorter than a length of the sides 658*a*-658*d*. It should be noted that in the special case where the fifth side 660*a* and the sixth side 660*b* have a length that is the same as a length of sides 658*a*-658*d*, the waveguide filter 600 may have a regular hexagonal cross-sectional geometry with complex sides. The term "hexagonal" as used herein, may include both irregular and regular hexagonal geometries.

The first ridge 614*a* of the first series of ridges 654 and the first ridge 614*b* of the second series of ridges 656 (as shown in FIG. 6A) may have similar characteristics discussed in connection with the first ridge 114 of the waveguide filter 100 first illustrated in FIG. 1. The first ridges 614*a*, 614*b* each include a ridge base 742*a*, 742*b* and a ridge upper side 744*a*, 744*b*. The first ridges 614*a*, 614*b* further include a first ridge side 746*a*, 746*b* and a second ridge side 747*a*, 747*b*. The first ridge side 746*a*, 746*b* and the second ridge side 747*a*, 747*b* may comprise equivalent or nearly equivalent lengths and may mirror one another as shown in FIG. 7. The ridge base 742*a*, 742*b* may comprise a longer length than the ridge upper side 744*a*, 744*b*. The ridge base 742*a* is attached to and forms an indivisible component of the fifth side 660*a* of the waveguide cavity 602, and the ridge base 742*b* is attached to and forms an indivisible component of the sixth side 660*b* of the waveguide cavity 602.

The first ridges 614*a*, 614*b* do not comprise perfect rectangular or square geometries. The first ridges 614*a*, 614*b* each include at least one internal angle that is non-orthogonal (i.e., not equal to 90°). The first ridges 614*a*, 614*b* include a first-upper angle 748*a*, 748*b* that is internal to the trapezoidal geometry and measured relative to the first ridge side 746*a*, 746*b* and the ridge upper side 744*a*, 744*b*. The first ridges 614*a*, 614*b* further each include a second-upper angle 749*a*, 749*b* that is internal to the trapezoidal geometry and measured relative to the second ridge side 747*a*, 747*b* and the ridge upper side 744*a*, 744*b*. The first-upper angle 748*a*, 748*b* and the second-upper angle 749*a*, 749*b* are greater than 90°. The first-upper angle 748*a*, 748*b* and the second-upper angle 749*a*, 749*b* may be equivalent or nearly equivalent to one another.

The first ridges 614*a*, 614*b* further include a first-base angle 774*a*, 774*b* that is internal to the quadrilateral geometry and measured relative to the first ridge side 746*a*, 746*b* and the ridge base 742*a*, 742*b*. The first ridges 614*a*, 614*b* includes a second-base angle 775*a*, 775*b* that is internal to the quadrilateral geometry and measured relative to the second ridge side 747*a*, 747*b* and the ridge base 742*a*, 742*b*. The first-base angle 774*a*, 774*b* and the second-base angle 775*a*, 775*b* are less than 90°. The first-base angle 774*a*, 774*b* and the second-base angle 775*a*, 775*b* may be equivalent or nearly equivalent to one another.

The waveguide filter 600 is oriented for construction relative to the build plate 740 by additive manufacturing techniques, such as three-dimensional printing using metal, such as metal powder or filaments. Construction of the waveguide filter 600 may be facilitated by the orienting of the waveguide filter 600 as shown with respect to the build plate 740 to keep an overhang angle of any downward facing surface from exceeding what can currently be printed. For example, as shown in FIG. 7, the waveguide filter 600 may be printed layer-upon-layer while always having a previous layer on which a subsequent layer may be built with minimal overhang (apart from the first layer to be printed) such that the aggregate of multiple individual printed layers produces a downward facing surface with a manufacturable overhang angle. In practice, an optimal minimum overhang angle of a downward facing surface may be 45° nominally. That is, the waveguide filter 600 may be constructed in parallel with a Z plane due to the hexagonal shape of the waveguide filter 600 by additive manufacturing. It is further noted that the waveguide filter 600 is illustrated as an irregular hexagon having two complex sides that are longer than the remaining 4 sides. The waveguide filter 600 may be implemented as an irregular hexagon as shown, a regular hexagon, or other types of irregular hexagons.

Figure 8A:
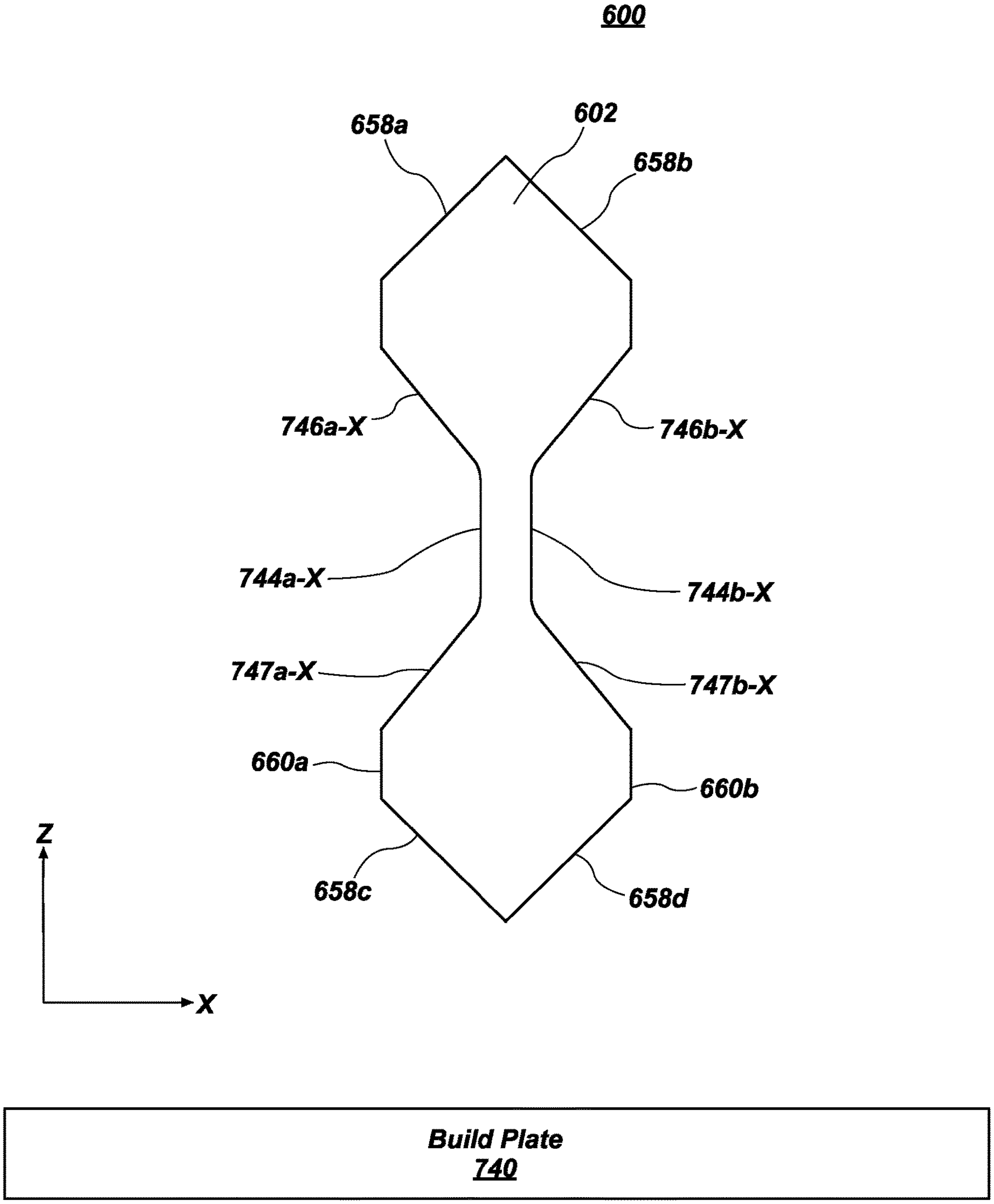
FIG. 8A illustrates a straight-on cross-sectional side view of an air volume of an irregular hexagonal waveguide cavity comprising two complex sides, wherein at least a portion of the sidewalls defining waveguide cavity meet at sharp edges.
Figure 8B:
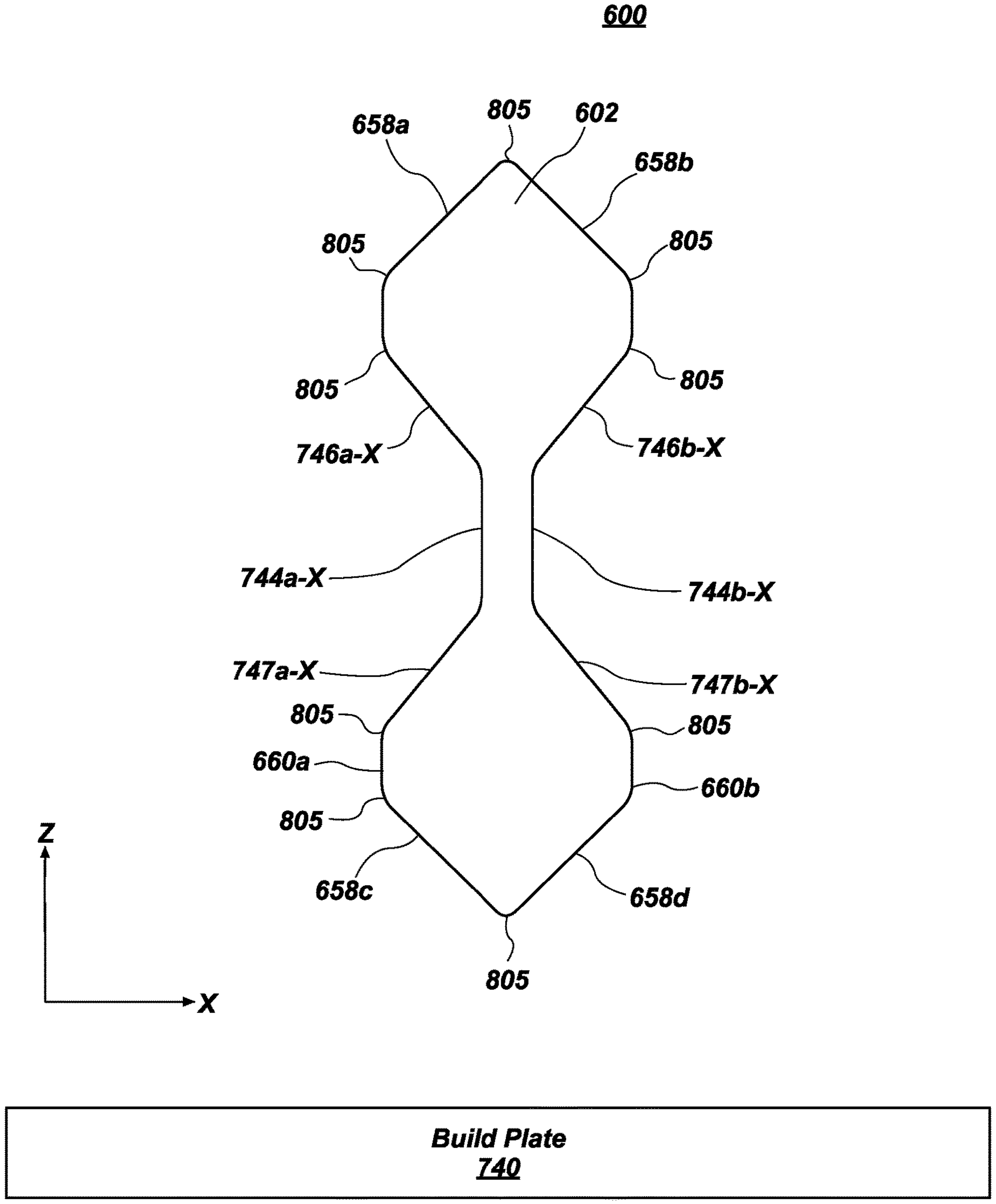
FIG. 8B illustrates a straight-on cross-sectional side view of an air volume of an irregular hexagonal waveguide cavity comprising two complex sides, wherein the sidewalls defining the waveguide cavity meet at radiused edges.

FIGS. 8A and 8B illustrate a straight-on cross-sectional side view of the waveguide filter 602 oriented for additive manufacturing with respect to the build plate 740. The build plate 740 extends along the X-Y plane and the waveguide filter 600 is fabricated in the positive Z-axis direction relative to the build plate 740. The waveguide cavity 602 extends in the Y-axis direction (i.e., into the page). In contrast with FIG. 7, which illustrates the solid structure of the first ridges (see 614*a*, 614*b* in FIG. 7), FIGS. 8A and 8B illustrate the cross-sectional geometry of the negative air space of the waveguide cavity 602 where the first ridges (see 614*a*, 614*b* first discussed in connection with FIG. 6B) extend into the waveguide cavity 602. In FIGS. 8A-8B, the regions associated with the first ridges (see 614*a*, 614*b* first discussed in connection with FIG. 6B) that cut into the air volume of the waveguide filter 600 are denoted with an "-X" to indicate that the first ridges (see 614*a*, 614*b* first discussed in connection with FIG. 6B) themselves are not illustrated in FIGS. 8A and 8B, but that the boundaries defined by the first ridges are altering the geometry of the waveguide cavity 602.

The waveguide cavity 602 is defined by the irregular hexagonal geometry comprising the first side 658*a*, the second side 658*b*, the third side 658*c*, the fourth side 658*d*, the fifth complex side 660*a*, and the sixth complex side 660*b*. The cross-sectional geometry of the air volume within the waveguide cavity 602 is further defined by the boundaries of the ridges of the first series of ridges 654 and the second series of ridges 656 as shown in FIG. 6A. FIGS. 8A and 8B illustrates that the waveguide cavity 602 comprises an irregular hexagonal cross-sectional geometry with complex sides where the boundaries of the first ridge sides 746*a*-X, 746*b*-X, the boundaries of the second ridge sides 747*a*-X, 747*b*-X, and the boundaries of the ridge upper sides 744*a*-X, 744*b*-X extend into the waveguide cavity 602.

The complex sides 660*a*, 660*b* are referred to as "complex" because the lengths of these sides are interrupted by a ridge of the waveguide filter 600. The fifth complex side 660*a* of the waveguide cavity 602 is defined at least in part by the boundary of the first ridge side 746*a*-X, the boundary of the ridge upper side 744*a*-X, and the boundary of the second ridge side 747*a*-X. The sixth complex side 660*b* of the waveguide cavity 602 is defined at least in part by boundary of the first ridge side 746*b*-X, the boundary of the ridge upper side 744*b*-X, and the boundary of the second ridge side 747*b*-X. Thus, the waveguide 602 comprises an irregular hexagonal cross-sectional geometry with two complex sides. Each of the complex sides is counted as one side of the irregular hexagonal cross-sectional geometry of the waveguide cavity 602.

The waveguide filter 600 is manufactured using metal additive manufacturing techniques. Metal additive manufacturing is a fabrication method that allows for complex integrated structures to be fabricated as a single part. However, one unique aspect of metal additive manufacturing, is these complex integrated structures are fabricated as layers laid on top of other layers of metal. Thus, orientation, or printing order, of specific parts or pieces must be considered to ensure that the hollow waveguide cavity 602 of the waveguide filter 600, or other structure, may be formed within an integrated structure without additional build support. In other words, during metal additive manufacturing, only a first layer of metal may be printed without having another layer underneath the first layer preferably in a positive Z-axis direction (e.g., from approximately 0° to approximately 90° to the X-Y plane). This is possible by printing on to a build plate 240 to support the build of a structure in, preferably, a positive Z-axis direction.

Further, another constraint of metal additive manufacturing is that a metal layer must be printed with a minimal overhang, based in part on laser spot diameter, on to another layer of metal (or build substrate in the case of the first metal layer). As previously discussed, overhang of an individual metal layer comprises the distance that an amount of solid metal material extends beyond material which has supporting material in the layer directly beneath it in the z-axis. In one example, a rectangular waveguide may have four sides, including a bottom, two vertical sides, and a top. Printing a rectangular waveguide, however, presents difficulties because, while the bottom and vertical sides may be easily printed, the upper side of the rectangular waveguide must be printed without a layer of material underneath the majority of the surface, referred to as an unsupported surface. Thus, any new layer has no metal layer overhang on which to print an upper side of the rectangular waveguide. To print a top surface, at least some overhang from a previous layer must extend, with a maximum single layer minimal overhang based on laser spot diameter, across a gap between the vertical sides of the rectangular waveguide to eventually join the vertical sides with an upper side. While some minimal overhang on each individual layer can be tolerated, an extended overhang length with overhang angle of 0°, or a right-angle, as in a rectangular waveguide, typically leads to mechanical defects or requires internal support structures to fabricate.

Thus, minimal single layer overhang and downward facing surface overhang angles are an important consideration when fabricating a waveguide using metal additive manufacturing techniques. Overhang angles of a downward facing surface at or near 0° can produce significant mechanical defects. Such overhang angles tend to occur where one or more walls of a component encounter a significant transition (e.g., an overhang angle approaching 0°) in the build direction, which results in an extended overhang of unsupported material on one or more individual layers. This unsupported material is exposed to high stresses in the build process and has high potential to deform or break. Therefore, it is desirable to maintain the minimum overhang angles of downward facing surfaces within an air volume of a printed structure within a prescribed range of 45°+/−20° through selective component shaping and build orientation during manufacturing. In some cases, it is desirable to maintain the overhang angles between 25° and 89°.

Construction of the waveguide filter 600 is facilitated by orienting the waveguide filter 600 as shown with respect to the build plate 740 to prevent any overhang angle from exceeding what can currently be printed. For example, as shown in FIGS. 8A and 8B, the waveguide filter 600 may be printed layer-upon-layer while always having a previous layer on which a subsequent layer may be built with minimal overhang (except for the first layer printed onto the build plate) such that the aggregate of multiple individual printed layers produces a downward facing surface with a manufacturable overhang angle. In practice, an optimal minimum overhang angle of a downward facing surface may be 45° nominally. That is, the waveguide filter 600 may be constructed in parallel with a Z plane due to the hexagonal shape of the waveguide filter 600 by additive manufacturing. It is further noted that the waveguide filter 600 is illustrated as an irregular hexagon having two complex sides that are longer than the remaining 4 sides. The waveguide filter 600 may be implemented as an irregular hexagon as shown, a regular hexagon, or other types of irregular hexagons.

FIG. 8A illustrates an implementation wherein the sidewalls defining the waveguide cavity 602 meet at sharp corners. FIG. 8B illustrates an implementation wherein the sidewalls defining the waveguide cavity 602 meet at radiused corners 805. The curvature of the radiused corners 805 may be optimized for fabricating the waveguide filter 600 using metal additive manufacturing techniques.

Figure 9:
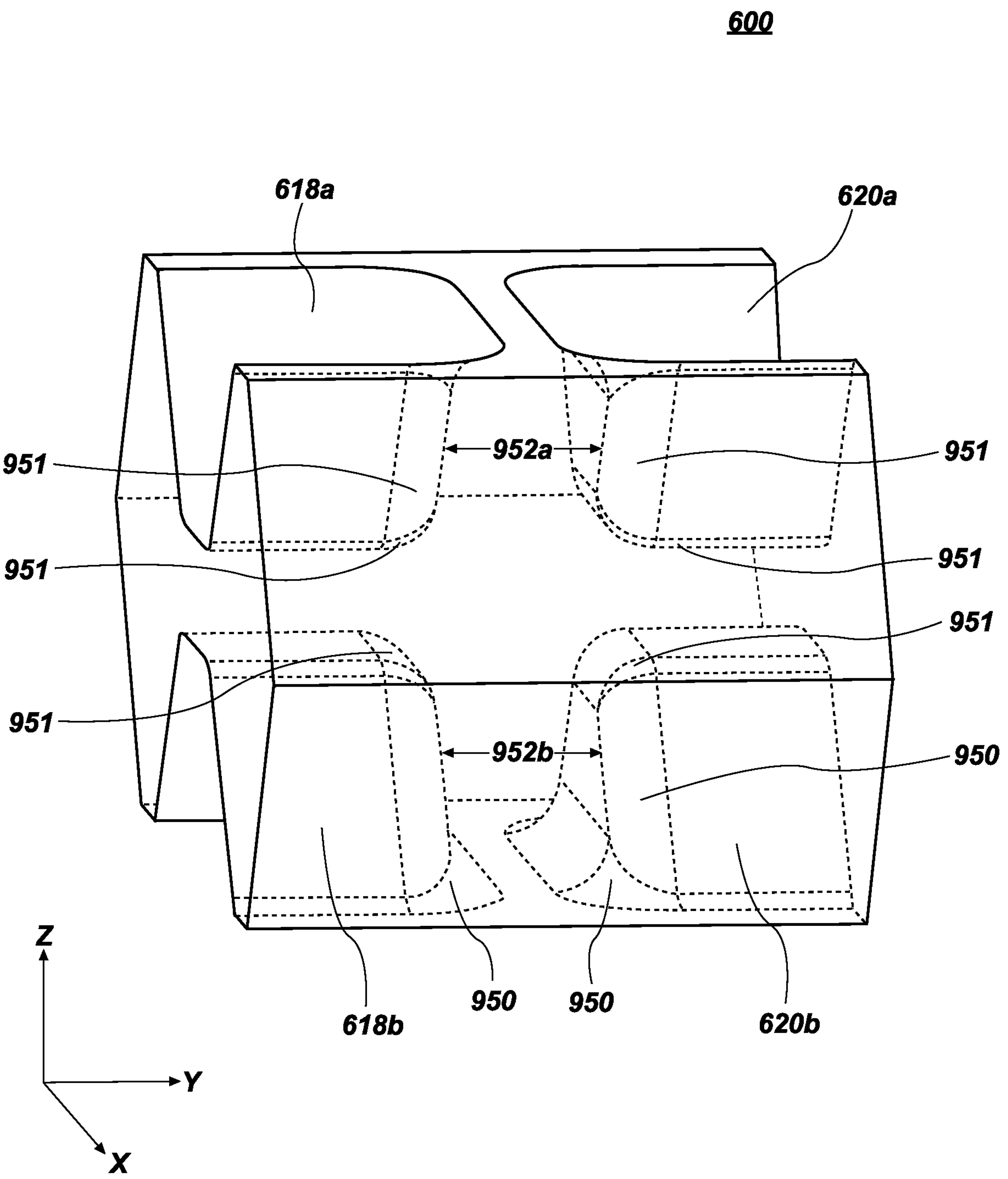
FIG. 9 illustrates a perspective view of a portion of a hexagonal dual ridge waveguide filter comprising two secondary ridges with an evanescent gap disposed between them.

FIG. 9 illustrates a perspective side view of the waveguide filter 600, wherein boundaries of the negative space (air volume) are illustrated with solid lines, and solid components within the air volume (ridges) are illustrated with dotted lines. FIG. 9 specifically illustrates two pairs of secondary ridges, including a third ridge 618*a* and a fourth ridge 620*a* of the first series of ridges 654, and a third ridge 618*b* and a fourth ridge 620*b* of the second series of ridges (see callout 656 as first discussed in connection with FIG. 6A). It should be appreciated that the waveguide filter 600 may include any number of primary or secondary ridges as deemed necessary based on desired performance characteristics.

Like the waveguide filter 100 first illustrated in FIG. 1, the ridges (see, for example, ridges 616*a*-634*a* and 616*b*-634*b* first discussed in connection with FIG. 6B) of the waveguide filter 600 are disposed within the waveguide cavity (see waveguide cavity 602 first discussed in connection with FIG. 6B) with evanescent gaps in between one another. Thus, the secondary ridges are not highly coupled to one another. FIG. 9 illustrates the evanescent gaps 952*a*, 952*b* between the third ridges 618*a*, 618*b* and the fourth ridges 620*a*, 620*b*. Each of the evanescent gaps 952*a*, 952*b* within the waveguide filter 600 (i.e., between two of the ridges which are not highly coupled) may comprise equivalent or nearly equivalent dimensions or may be entirely different between different ridges. The third ridges 618*a*, 618*b* and the fourth ridges 620*a*, 620*b* are illustrated for exemplary purposes only, and the evanescent gaps 952*a*, 952*b* may be the same between any two ridges of the waveguide filter 600 or may be entirely different between different ridges. The evanescent gaps 952*a*, 952*b* may be adjusted to change performance characteristics of the waveguide filter 600, such as frequency passband, rejection band, and other performance characteristics.

Figure 10:
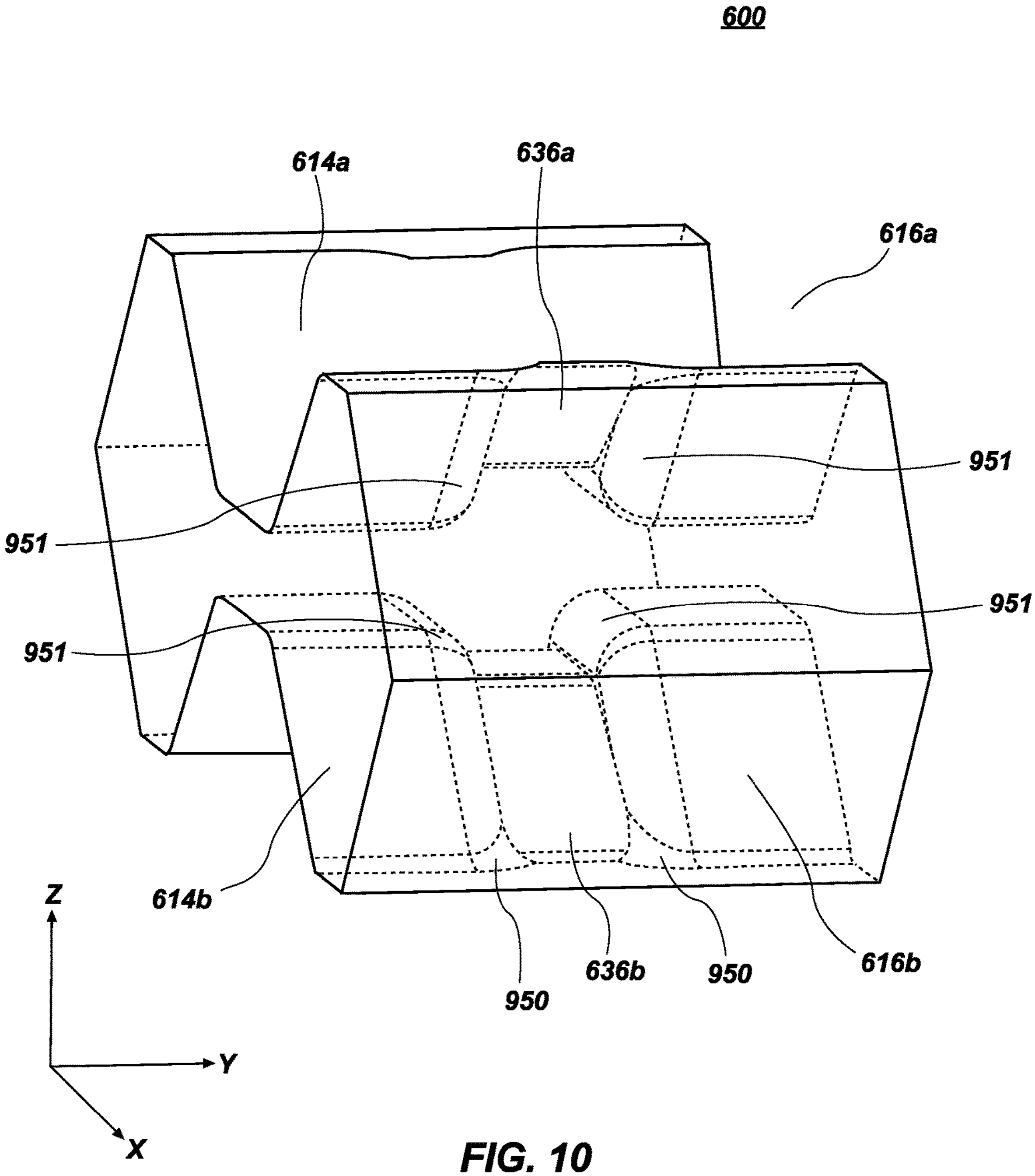
FIG. 10 illustrates a perspective view of a portion of a hexagonal single ridge waveguide filter comprising two highly coupled ridges with a coupling ridge disposed between them.

FIG. 10 illustrates a perspective view of a portion of the waveguide filter 600, wherein boundaries of the negative space (air volume) are illustrated with solid lines, and solid components within the air volume (ridges) are illustrated with dotted lines. FIG. 10 specifically illustrates a portion of a first ridge 614*a* and a second ridge 616*a* of the first series of ridges 654, and a portion of a first ridge 614*b* and a second ridge 616*b* of the second series of ridges (see callout 656 as first discussed in connection with FIG. 6A).

The first ridges 614*a*, 614*b* and the second ridges 616*a*, 616*b* are highly coupled to one another by way of a first-second coupling ridge 636*a*, 636*b*, respectively. Like the waveguide filter 100 first illustrated in FIG. 1, the waveguide filter 600 may have similarly highly coupled ridge pairs on an opposite end of the waveguide cavity (see waveguide cavity 602 first discussed in connection with FIG. 6B). The spacings between the first ridges 614*a*, 614*b* and the second ridges 616*a*, 616*b* may be optimized for desired performance characteristics of the waveguide filter 600.

The ridges 614*a*-616*a*, 614*b*-616*b* include radiused edges 950, 951 to facilitate manufacturing with additive manufacturing techniques. Additionally, the coupling ridges 636*a*, 636*b* include one or more concave radiused edges 950 and convex radiused edges 951 to facilitate manufacturing with additive manufacturing techniques. The dimensions of the coupling ridges 636*a*, 636*b* may be adjusted to change performance characteristics of the waveguide filter 600, such as frequency passband, rejection band, and other performance characteristics.

Figure 11:
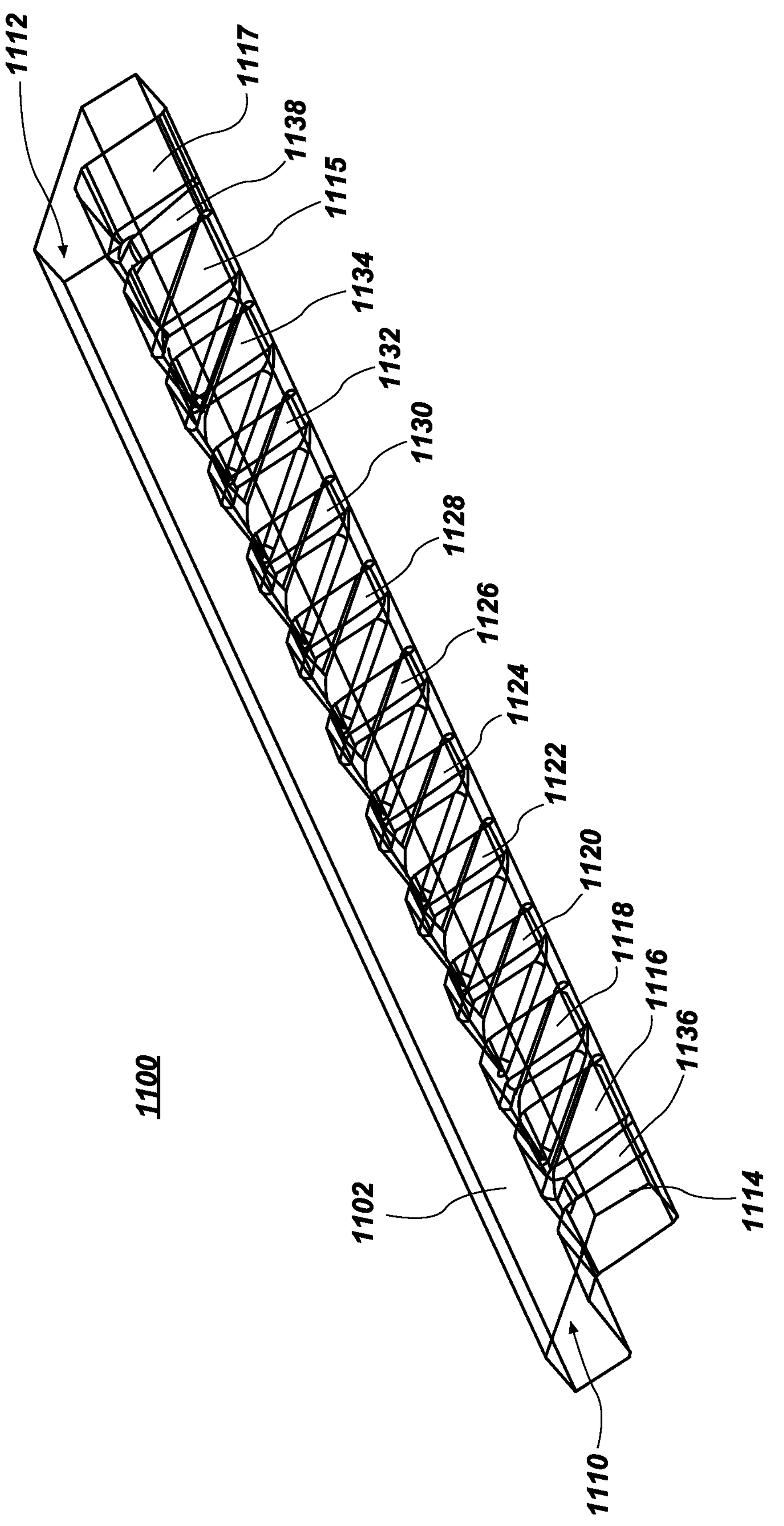
FIG. 11 illustrates a perspective view of an air volume within a hexagonal single ridge waveguide filter comprising a plurality of ridges posed within a waveguide cavity.

FIG. 11 illustrates a perspective view of air volume of a hexagonal single ridge waveguide filter 1100. The waveguide filter 1100 is an evanescent mode waveguide filter with a hexagonal cross-sectional air volume. The waveguide filter 1100 has characteristics like those of the waveguide filter 100 first illustrated in FIG. 1 and the waveguide filter 600 first illustrated in FIG. 6A. Like the waveguide filter 600, the waveguide filter 1100 includes an irregular hexagonal cross-sectional geometry with complex side. The waveguide filters 600 and 1100 differentiate in that the waveguide filter 600 comprises two series of ridges 654, 656, and the waveguide filter 1100 includes a single series of ridges (i.e. waveguide filter 600 has two complex sides in cross-section and waveguide filter 1100 has a single complex side in cross-section).

The waveguide filter 1100 includes a waveguide cavity 1102, which is a negative space (air volume) wherein an electromagnetic signal may propagate along the length of the waveguide filter 1100. The waveguide filter 1100 includes a first propagation channel port 1110 and a second propagation channel port 1112. The waveguide filter 1100 includes a plurality of ridges 1114-1134. The waveguide filter 1100 includes coupling ridges 1136, 1138 between pairs of the highly coupled ridges 1114-1117. The first ridge 1114 is highly coupled to the second ridge 1116 by way of the first coupling ridge 1136. The twelfth ridge 1115 is highly coupled to the thirteenth ridge 1117 by way of the second coupling ridge 1138. The ridges 1115-1134 comprise an evanescent gap disposed between one another.

The secondary ridges 1118-1134 may be separated from each other as individual discrete structures within the waveguide filter 1100. The waveguide filter 1100 is a lowpass filter architecture which allows electromagnetic signals having a particular frequency bandwidth of operation to pass through the waveguide cavity 1102 while rejecting all frequencies above the passband. Implementation of a lowpass filter architecture in waveguide such as that shown in waveguide cavity 1102 of FIG. 11 results in filter performance that allows electromagnetic signals within a passband of frequencies to pass through the filter while rejecting frequencies above the passband for a wide rejection frequency bandwidth. The start of the passband resides above the waveguide cutoff defined by the cross-section geometry of first propagation channel port 1110 and second propagation channel port 1112. The rejection band of a lowpass filter such as that shown in FIG. 11 is significantly wider than alternative waveguide lowpass filter architectures due to higher order mode suppression enabled by evanescent gaps between ridges. For example, the waveguide filter 1100 may be implemented with a passband to allow frequencies between 15 GHz and 22.5 GHz to pass through the waveguide cavity 1102. This implementation will reject electromagnetic signals with a frequency below the waveguide cutoff defined by the cross-sectional geometry of first propagation channel port 1110 and second propagation channel port 1112, and electromagnetic signals with a frequency above the 22.5 GHz start of the rejection band. In this example, the frequency range between 15 GHz and 22.5 GHz may be referred to as a "passband of the lowpass filter" frequencies below the 15 GHz bottom of the passband and above the 22.5 GHz top of the passband may be referred to as a "rejection band". It should be understood that the rejection increases for a wide bandwidth as the frequency of the rejection is separated further from the passband.

The cross-sectional geometries, length, and positioning of ridges 1114-1134, length of coupling ridges 134-136, and length of evanescent gaps between ridges 116-132 are optimized based on the desired filter passband and rejection band. The waveguide filter 1100 is optimized for a certain desired filter passband and rejection band, and this is achieved by altering the physical characteristics of one or more of the plurality of ridges 1114-1134, coupling ridges 1136-1138, and evanescent gaps between ridges 1116-1132. The passband and rejection band may be adjusted by changing one or more of: the distance between each of the ridges 1114-1134, the quantity of the ridges 1114-1134, the dimensions of the ridges 1114-1134, the lengths of the coupling ridges 1136-1138, the lengths of the evanescent gaps between ridges 1116-1132, and other physical changes known to those of skill in the art.

Figure 12:
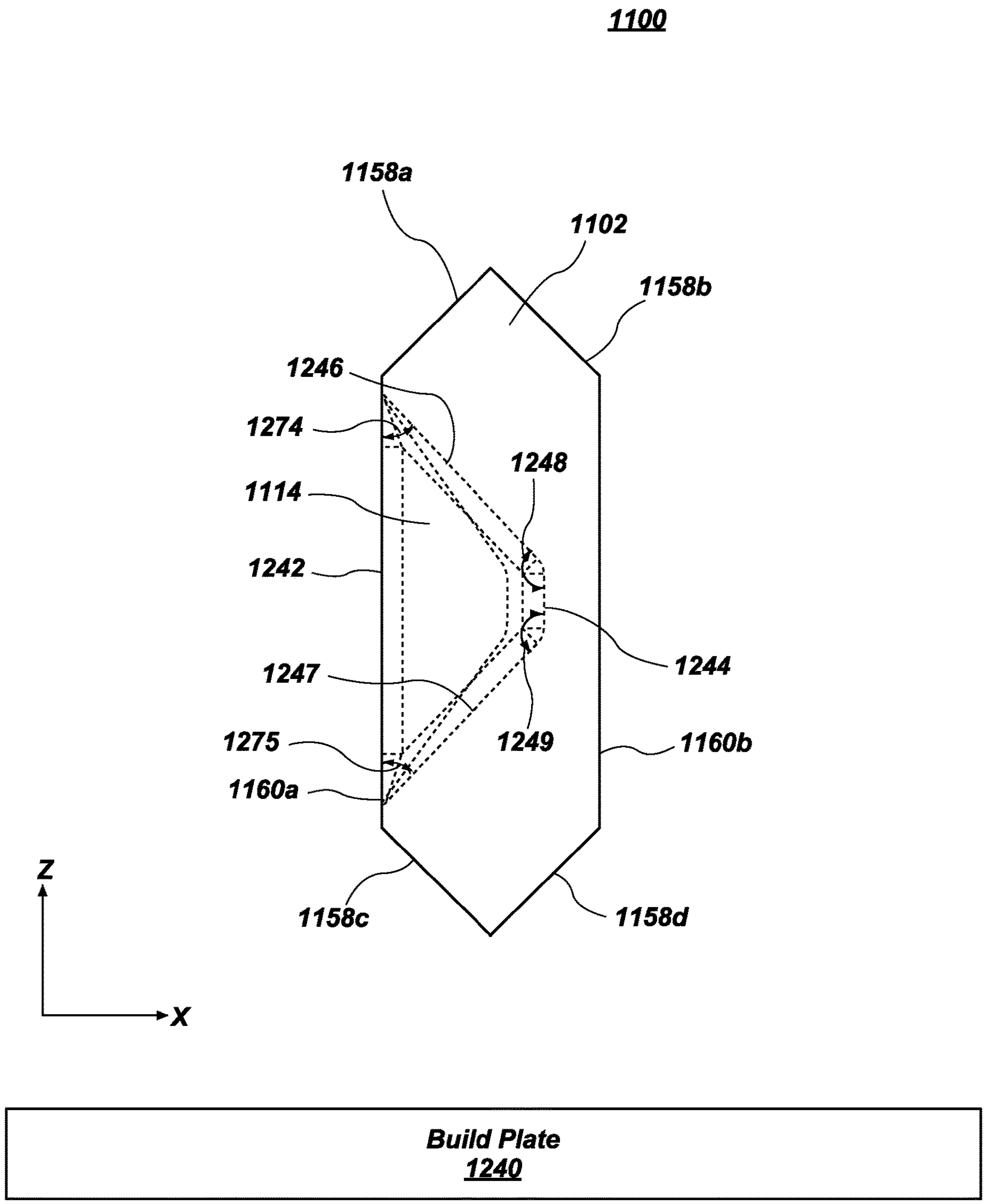
FIG. 12 illustrates a straight-on side view of a ridge disposed within a hexagonal waveguide cavity of a hexagonal single ridge waveguide filter.

FIG. 12 illustrates a straight-on side view of the waveguide filter 1100 as shown in FIG. 11. Following the same convention used in connection with other figures herein, FIG. 12 depicts the solid structures (i.e., the first ridge 1114) with dotted lines and depicts the outline of negative air space (i.e., the waveguide cavity 1102) with solid lines. The boundaries of the waveguide cavity 1102 are defined by solid metal structures that could be a standalone filter or an indivisible component of a more complex assembly such as an antenna array. The solid metal first ridge 1114 extends into the irregular hexagonal boundaries of the waveguide cavity 1102. FIG. 12 specifically illustrates a straight-on side view staring down the waveguide cavity 1102 with a view of a side of the first ridge 1114. Much of the disclosure presented in connection with FIG. 12 may be applied to any of the ridges 1114-1134 of the waveguide filter 1100.

The waveguide filter 1100 is oriented for fabrication using metal additive manufacturing techniques relative to a build plate 1240. The build plate 1240 extends along the X-Y plane and the waveguide filter 1100 is fabricated in the positive Z-axis direction relative to the build plate 1240. The waveguide cavity 1102 extends in the Y-axis direction (i.e., into the page) and a straight-on side view of the first ridge 1114 is visible.

The waveguide filter 1100 may be fabricated using metal additive manufacturing techniques (i.e., three-dimensional printing using metal powder or filaments). The fabrication of the waveguide filter 1100 is facilitated by orientating the waveguide filter 1100 as shown in FIG. 12 with respect to the build plate 1240. This prevents any overhang angle of a downward facing surface from exceeding what can be printed using metal additive manufacturing techniques. The waveguide cavity 1102 may be printed layer-upon-layer, and in practice, the waveguide cavity 1102 may be oriented such that all overhang angles may be 45° nominally or more. That is, the waveguide filter 1100 may be oriented in an X-Z Cartesian plane for building by additive manufacturing such that overhang angles of waveguide walls **1158*a*, 1158*b*, and ridge wall 1247 are nominally 45°. The waveguide filter 1100 may be oriented such that overhang angles are between 65° and 25° in an X-Z Cartesian plane for building by additive manufacturing. The waveguide filter 1100 may have downward facing surfaces, such as waveguide walls 1158*a* and 1158*b*, or ridge wall 1247**, designed such that the resulting overhang angle in a desired build orientation is greater than 25°.

Like the waveguide filter 600 first illustrated in FIG. 6A, the waveguide filter 1100 includes an irregular hexagonal cross-sectional geometry with complex side. The waveguide filter 1100 includes a first side **1158*a* and a second side 1158*b* which are symmetrical with identical lengths. The waveguide filter 1100 further includes a third side 1158*c* and a fourth side 1158*d* which are symmetrical with identical lengths. As shown in FIG. 12, each of sides 1158*a*-1158*d* are symmetrical with identical lengths. However, the sides 1158*a*-1158*d* need not be symmetrical or have identical lengths. Each of the sides 1158*a*-1158*d* may have different lengths or some of the sides 1158*a*-1158*d* may have similar lengths while others of the sides 1158*a*-1158*d*** may have different lengths.

The waveguide filter 1100 is referred to as having an irregular hexagonal cross-sectional geometry with complex side because the fifth side **1160*a* and the sixth side 1160*b* each have a length that is different from the sides 1158*a*-1158*d*, and fifth side 1160*a* is complex. As shown in FIG. 12, the fifth side 1160*a* and the sixth side 1160*b* have a same length that is longer than a length of sides 1158*a*-1158*d*. Although, it is conceivable, that the fifth side 1160*a* and the sixth side 1160*b* may have a length that is the same as or shorter than a length of the sides 1158*a*-1158*d*. It should be noted that in the special case where the fifth side 1160*a* and the sixth side 1160*b* have a length that is the same as a long of sides 1158*a*-1158*d*, the waveguide filter 1100** may have a regular hexagonal cross-sectional geometry. The term "hexagonal" as used herein, may include both irregular and regular hexagonal geometries.

The waveguide filter 1100 is oriented for construction relative to the build plate 1240 by additive manufacturing techniques, such as three-dimensional printing using metal, such as metal powder or filaments. Construction of the waveguide filter 1100 may be facilitated by the orienting of the waveguide filter 1100 as shown with respect to the build plate 1240 to keep an overhang angle of any downward facing surface from exceeding what can currently be printed. For example, as shown in FIG. 12, the waveguide filter 1100 may be printed layer-upon-layer while always having a previous layer on which a subsequent layer may be built with minimal overhang (apart from the first layer to be printed) such that the aggregate of multiple individual printed layers produces a downward facing surface with a manufacturable overhang angle. In practice, the waveguide cavity 1102 may be oriented such that all overhang angles may be 45° nominally or more. That is, the waveguide filter

1100 may be constructed in parallel with a Z plane due to the hexagonal shape of the waveguide filter 1100 by additive manufacturing. It is further noted that the waveguide filter 1100 is illustrated as an irregular hexagon having two sides that are longer than the remaining 4 sides. The waveguide filter 1100 may be implemented as an irregular hexagon as shown, a regular hexagon, or other types of irregular hexagons.

The waveguide filter 1100 includes the first ridge 1114 which is illustrated in FIG. 12. The disclosures presented in connection with the first ridge 1114 may be applied to any of the ridges of the waveguide filter 1100 (see, for example, ridges 1114-1134 first discussed in connection with FIG. 11). The first ridge 1114 includes a ridge base 1242 and a ridge upper side 1244. The first ridge 1114 further includes a first ridge side 1246 and a second ridge side 1247. The first ridge side 1246 and the second ridge side 1247 may comprise equivalent or nearly equivalent lengths and may mirror one another as shown in FIG. 12. The ridge base 1242 may comprise a longer length than the ridge upper side 1244. The ridge base 1242 is attached to and forms an indivisible component of the fifth side 1160*a* of the waveguide filter 1100. The ridge base 1242 may be indivisibly formed in connection with the fifth side 1160*a* layer-by-layer during a metal additive manufacturing process. This configuration results in the first ridge 1114 comprising a quadrilateral geometry, and specifically comprising a trapezoidal geometry.

The first ridge 1114 does not comprise a perfect rectangular or square geometry. The first ridge 1114 includes at least one internal angle that is non-orthogonal (i.e., not equal to 90°). The first ridge 1114 includes a first-upper angle 1248 that is internal to the trapezoidal geometry and measured relative to the first ridge side 1246 and the ridge upper side 1244. The first ridge 1114 includes a second-upper angle 1249 that is internal to the trapezoidal geometry and measured relative to the second ridge side 1247 and the ridge upper side 1244. The first-upper angle 1248 and the second-upper angle 1249 are greater than 90°. The first-upper angle 1248 and the second-upper angle 1249 may be equivalent or nearly equivalent to one another.

The first ridge 1114 further includes a first-base angle 1274 that is internal to the quadrilateral geometry and measured relative to the first ridge side 1246 and the ridge base 1242. The first ridge 1114 includes a second-base angle 1275 that is internal to the quadrilateral geometry and measured relative to the second ridge side 1247 and the ridge base 1242. The first-base angle 1274 and the second-base angle 1275 are less than 90°. The first-base angle 1274 and the second-base angle 1275 may be equivalent or nearly equivalent to one another.

Figure 13A:
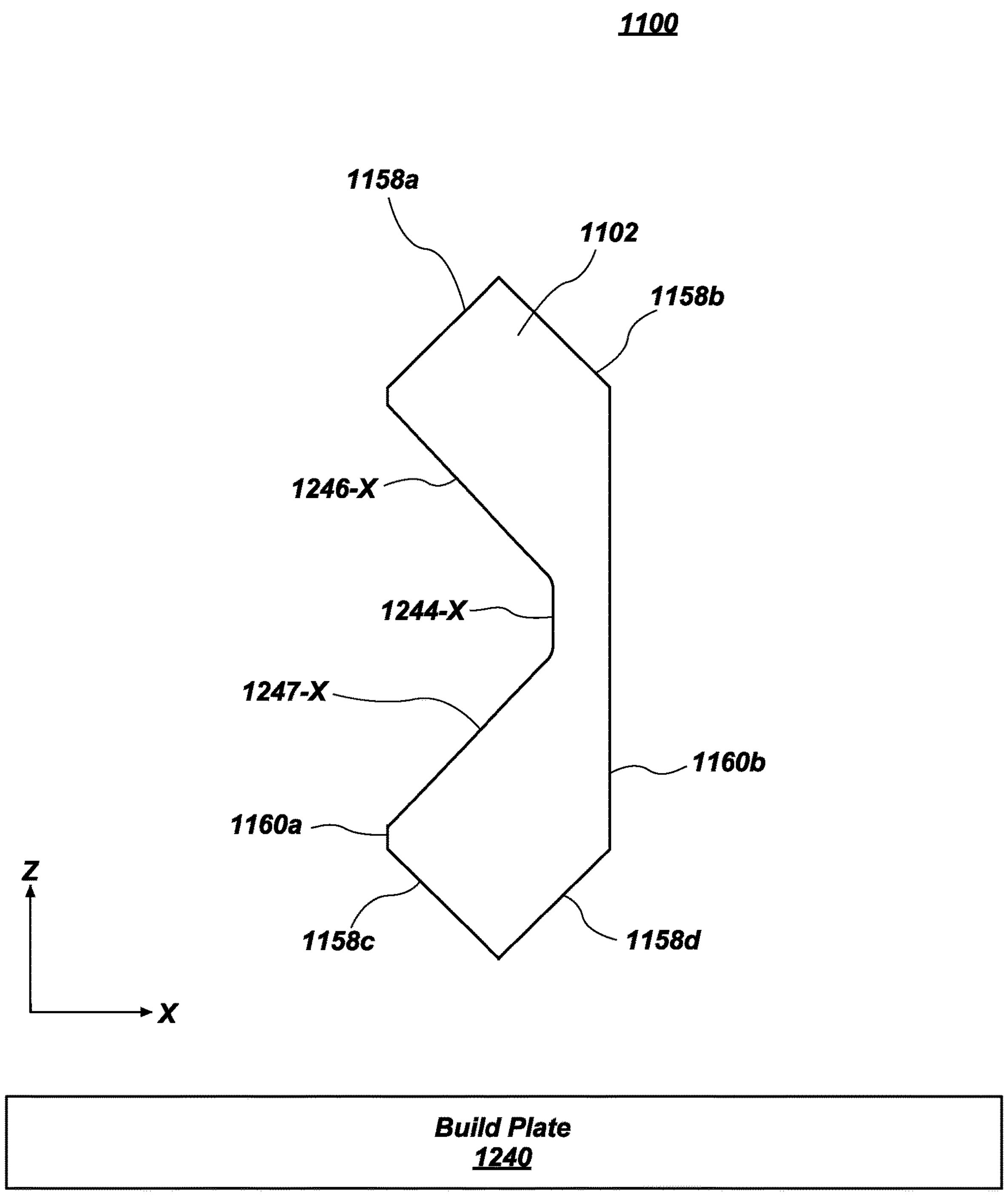
FIG. 13A illustrates a straight-on cross-sectional side view of an air volume of an irregular hexagonal waveguide cavity comprising one complex side, wherein at least a portion of the sidewalls defining the waveguide cavity meet at sharp edges.
Figure 13B:
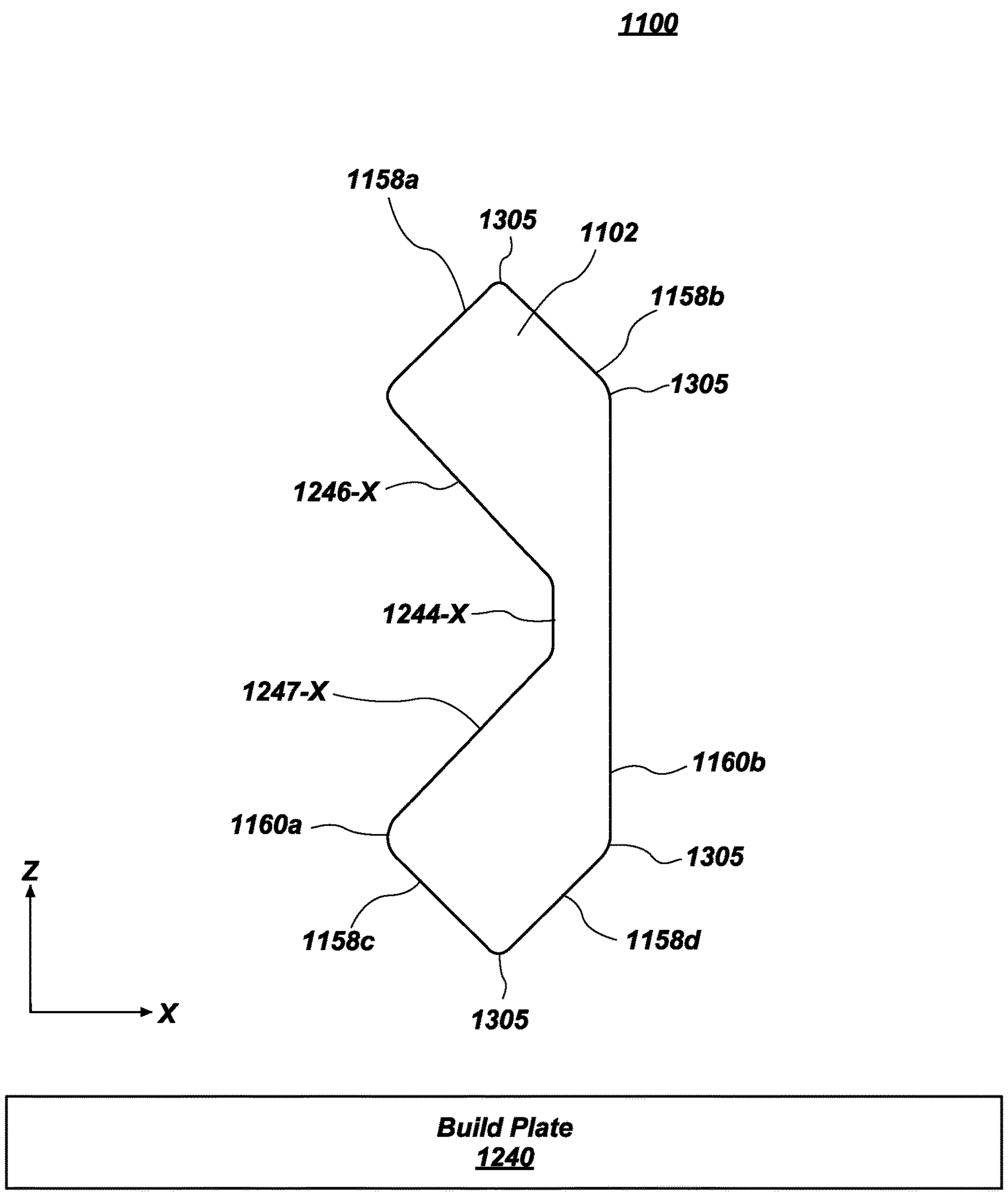
FIG. 13B illustrates a straight-on cross-sectional side view of an air volume of an irregular hexagonal waveguide cavity comprising one complex side, wherein the sidewalls defining the waveguide cavity meet at radiused edges.

FIGS. 13A and 13B illustrate a straight-on cross-sectional side view of the waveguide filter 1100 oriented for additive manufacturing with respect to the build plate 1240. The build plate 1240 extends along the X-Y plane and the waveguide filter 1100 is fabricated in the positive Z-axis direction relative to the build plate 1240. The waveguide cavity 1102 extends in the Y-axis direction (i.e., into the page). In contrast with FIG. 12, which illustrates the solid structure of the first ridge 1114, FIGS. 13A and 13B illustrate the cross-sectional geometry of the negative air space of the waveguide cavity 1102 where the first ridge (see 1114 at least as illustrated in FIG. 12) extends into the waveguide cavity 1102. In FIGS. 13A and 13B, the regions associated with the first ridge that cut into the air volume of the waveguide filter 1100 are denoted with an "-X" to indicate that the first ridge itself is not illustrated in FIGS. 13A and 13B, but that the boundaries defined by the first ridge are altering the geometry of the waveguide cavity 1102.

The waveguide cavity 1102 is defined by the irregular hexagonal geometry with complex side comprising the first side 1158*a*, the second side 1158*b*, the third side 1158*c*, the fourth side 1158, the fifth complex side 1160*a*, and the sixth side 1160*b*. The cross-sectional geometry of the air volume within the waveguide cavity 1102 is further defined by the boundaries of the ridges (see, for example, ridges 1114-1134 first discussed in connection with FIG. 11) and coupling ridges (see, for example, coupling ridges 1136, 1138 first discussed in connection with FIG. 11). FIGS. 13A and 13B illustrate that the waveguide cavity 1102 comprises an irregular hexagonal cross-sectional geometry with complex side where the boundary of the first ridge side 1246-X, the boundary of the second ridge side 1247-X, and the boundary of the ridge upper side 1244-X extend into the waveguide cavity 1102.

The waveguide cavity 1102 is a single ridge waveguide, and this is contrasted with the dual ridge waveguide of the waveguide cavity. The dual ridge waveguide illustrated in FIGS. 8A and 8B comprises two complex sides that are formed by two ridges on opposite sides of the irregular hexagonal cross-sectional geometry. The single ridge waveguide illustrated in FIGS. 13A and 13B include one complex side that is formed by one ridge formed on one side of the irregular hexagonal cross-sectional geometry. The fifth complex side 1160*a* is defined by each of the boundary of the first ridge side 1246-X, the boundary of the ridge upper side 1244-X, and the boundary of the second ridge side 1247-X. This fifth complex side 1160*a* of the waveguide cavity 1102 is still counted as one side of the irregular hexagonal cross-sectional geometry of the single ridge waveguide.

FIG. 13A illustrates an implementation wherein the sidewalls defining the waveguide cavity 1102 meet at sharp corners. FIG. 13B illustrates an implementation wherein the sidewalls defining the waveguide cavity 1102 meet at radiused corners 1305. The curvature of the radiused corners 1305 may be optimized for fabricating the waveguide filter 1100 using metal additive manufacturing techniques.

Figure 14:
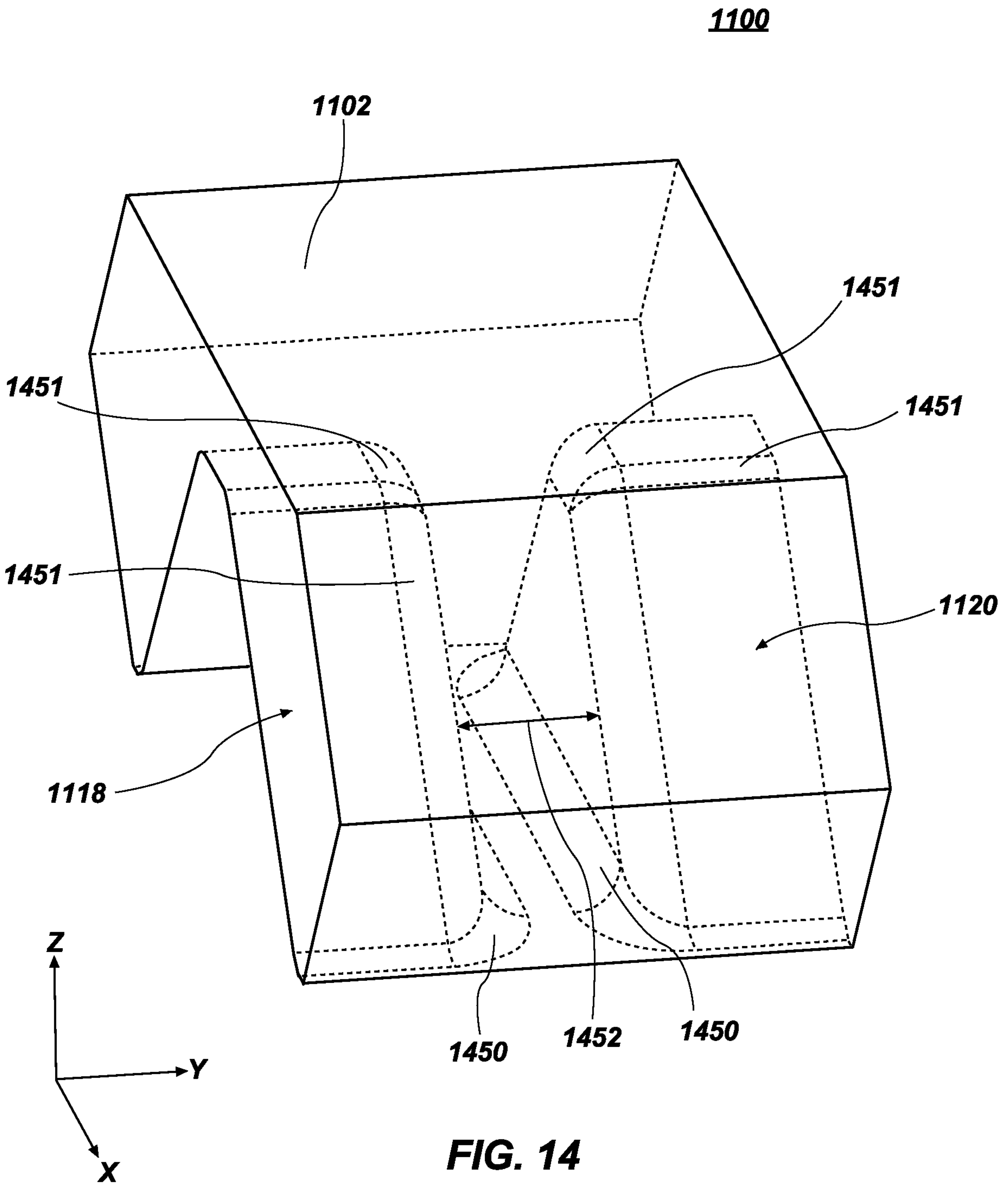
FIG. 14 illustrates a perspective view of a portion of a hexagonal single ridge waveguide filter comprising two secondary ridges with an evanescent gap disposed between them.

FIG. 14 illustrates a perspective view of a portion of the waveguide filter 1100, and specifically illustrates a perspective view of portions of the third ridge 1118 and the fourth ridge 1120. Consistent with the conventions used in other figures herein, the boundary of negative space (air volume) is illustrated with solid lines, and solid components within the negative space are illustrated with dotted lines. The secondary ridges 1118-1134 of the waveguide filter 1110 (see at least FIG. 11) comprise similar features and characteristics as those secondary ridges 118-130 described in connection with the waveguide filter 100 (see at least FIG. 1) and the secondary ridges 618*a*-634*a* and 618*b*-634*b* described in connection with the waveguide filter 600 (see at least FIG. 6B), such that the disclosures presented in connection with the waveguide filter 100 of FIG. 1 and the waveguide filter 600 of FIG. 6B are similarly applicable to the waveguide filter 1100 of FIG. 11.

The secondary ridges 1118 and 1120 are not highly coupled to one another such that there is an evanescent gap 1452 between the third ridge 1118 and the fourth ridge 1120. The evanescent gap 1452 is the distance between two ridges (see ridges 1116-1134 at FIG. 11), which may be the same or may be entirely different between ridges. The evanescent gap 1452 constitutes negative space, or air volume, within the waveguide cavity 1102. The length of the evanescent gap 1452 may change from a bottom end of the ridges up to the top ends of the ridges depending on the geometry of the ridges themselves. The dimensions of the evanescent gaps 1452 may be adjusted to change performance characteristics of the waveguide filter 1100, such as frequency passband, rejection band, and other performance characteristics. The ridges may include radiused edges 1450, 1451 to facilitate printing by additive manufacturing techniques. The ridges specifically include a combination of concave radiused edges 1450 and convex radiused edges 1451.

Figure 15:
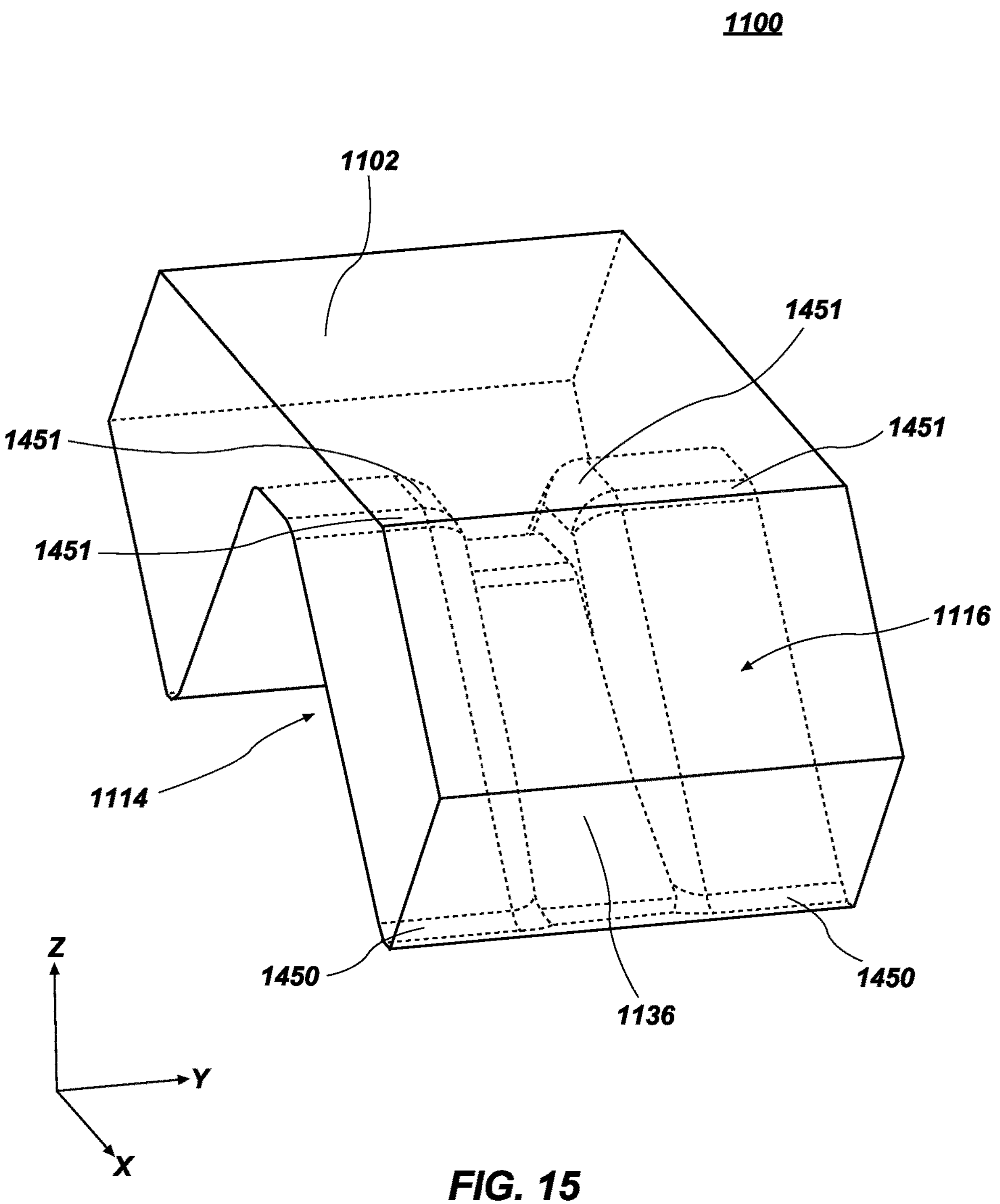
FIG. 15 illustrates a perspective view of a portion of a hexagonal single ridge waveguide filter comprising two highly coupled ridges with a coupling ridge disposed between them.

FIG. 15 illustrates a perspective view of a portion of the waveguide filter 1100, and specifically illustrates a perspective view of portions of the first ridge 1114 and the second ridge 1116. Consistent with the conventions used in other figures herein, the boundary of negative space (air volume) is illustrated with solid lines, and solid components within the negative space are illustrated with dotted lines.

The first ridge 1114 and the second ridge 1116 are highly coupled to one another by way of the first-second coupling ridge 1136. Similarly, the twelfth ridge 1115 and the thirteenth ridge 1117 are highly coupled to one another by way of the twelfth-thirteenth coupling ridge 1138 (not pictured in FIG. 15, see at least FIG. 11). The spacing between the first ridge 1114 and the second ridge 1116 may be optimized for desired performance characteristics of the waveguide filter 1100.

The ridges (see 1114-1134 at FIG. 11) include radiused edges 1450, 1451 to facilitate manufacturing with additive manufacturing techniques. Additionally, the coupling ridges (see 1136, 1138 at FIG. 11) include one or more concave radiused edges 1450 and convex radiused edges 1451 to facilitate manufacturing with additive manufacturing techniques. The dimensions of the coupling ridges (see 1136, 1138 at FIG. 11) may be adjusted to change performance characteristics of the waveguide filter 1100, such as frequency passband, rejection band, and other performance characteristics.

Figure 16A:
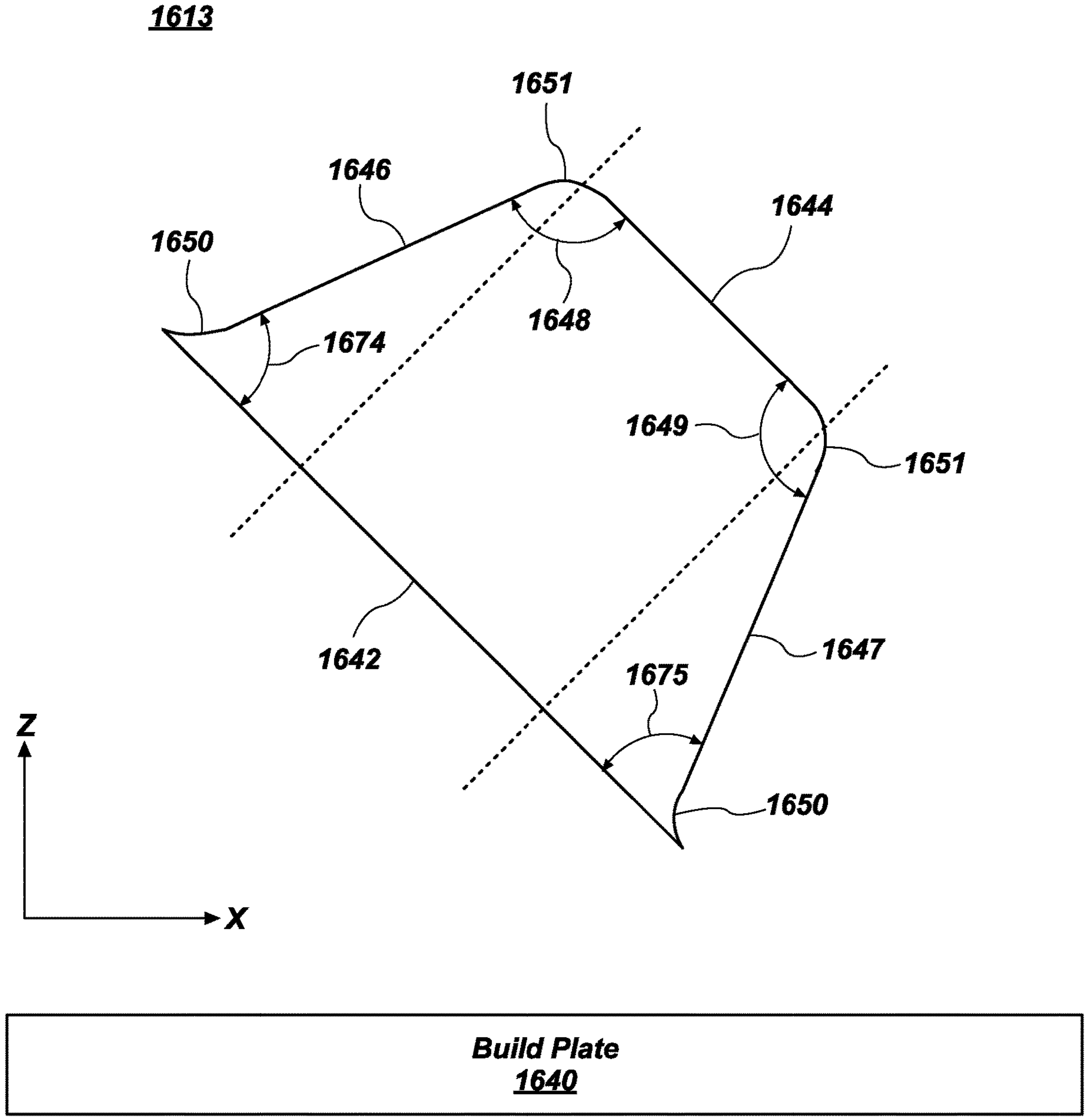
FIGS. 16A and 16B illustrate a schematic diagram of a ridge comprising radiused edges, wherein the ridge is oriented for additive manufacturing relative to a build plate.
Figure 16B:
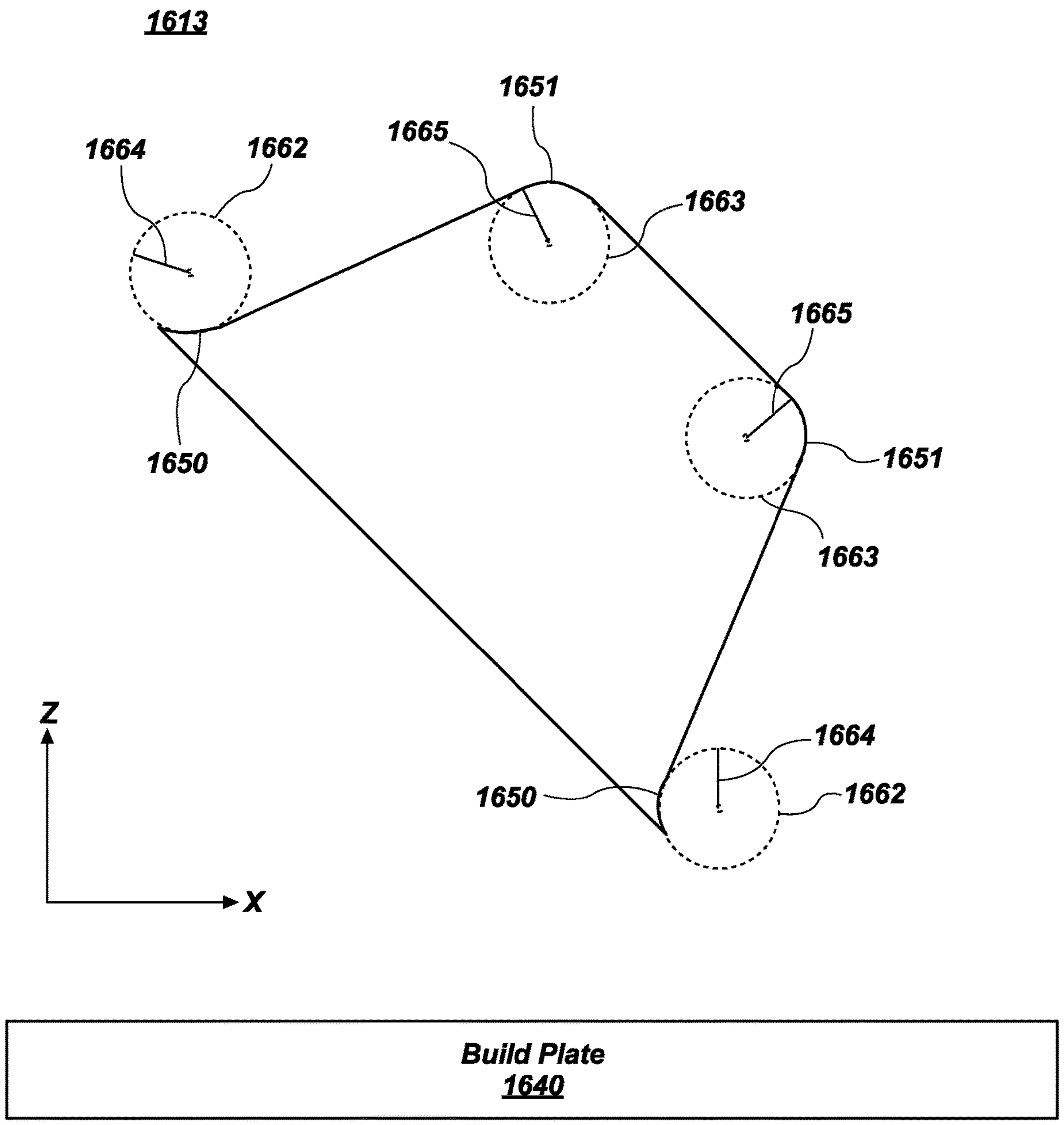

FIGS. 16A and 16B illustrates a schematic diagram of a straight-on side view of a ridge 1613 oriented relative to a build plate 1640. The ridge 1613 illustrated in FIGS. 16A-16B represents characteristics of any of the ridges described herein, including ridges, and coupling ridges (see, e.g., ridges 114-134 first illustrated in FIG. 1; ridges 614*a*-634*a* first illustrated in FIG. 6; ridges 614*b*-634*b* first illustrated in FIG. 6; and ridges 1114-1134 first illustrated in FIG. 11). Additionally, the radiused edges illustrated in FIGS. 16A and 16B are also illustrative of the coupling ridges described herein, including the coupling ridges 136, 138 of the waveguide filter 100, the coupling ridges 636*a*, 636*b*, 638*a*, 638*b* of the waveguide filter 600, and the coupling ridges of 1136, 1138 of the waveguide filter 1100.

The ridge 1613 includes a first-upper angle 1648 where the first ridge side 1646 is connected to the ridge upper side 1644 as shown in FIG. 16A, and further includes a second-upper angle 1649 wherein the second ridge side 1647 is connected to the ridge upper side 1644. The ridge 1613 further includes a first-base angle 1674 where the first ridge side 1646 is connected to the ridge base 1642, and further includes a second-base angle 1675 where the second ridge side 1647 is connected to the ridge base 1642. None of the first-upper angle 1648, the second-upper angle 1649, the first-base angle 1674, or the second-base angle 1675 comprises an orthogonal (90°) interior angle (i.e., interior to the trapezoidal geometry formed by the ridge 1613) relative to the two connecting sides.

The angles on the shorter end of the trapezoidal geometry of the ridge 1613 (i.e., the upper end relative to the build plate 1640 in FIGS. 16A-16B), including the first-upper angle 1648 and the second-upper angle 1649, may be equivalent or nearly equivalent to one another. The angles on the longer end of the trapezoidal geometry of the ridge 1613 (i.e., the lower end relative to the build plate 1640 in FIGS. 16A-16B), including the first-base angle 1674 and the second-base angle 1675, may be equivalent or nearly equivalent to one another. The sum of one shorter-end angle 1648, 1649 and one longer-end angle 1674, 1675 may be equal to 180°. The sum of all interior angles of the trapezoidal geometry of the ridge 1613, including each of the shorter-end angles 1648, 1649 and each of the longer-end angles 1674, 1675, is equal to 360°.

The ridge 1613 may have a trapezoidal cross-sectional geometry as shown herein. The ridge 1613 may have any suitable quadrilateral cross-sectional geometry, including acute trapezoidal, right trapezoidal, obtuse trapezoidal, isosceles trapezoidal, three-sides-equal trapezoidal, rhombus, parallelogram, rectangular, and square. In an implementation where a first side and a second side connected to the first side comprise a non-orthogonal angle relative to one another, then the ridge 1613 will not have a rectangular or square cross-sectional geometry.

The dotted reference lines illustrated in FIG. 16A provide a visualization of a 90° angle relative to either of the ridge base 1642 or the ridge upper side 1644. As shown in FIG. 16A, the first-upper angle 1648 and the second-upper angle 1649 are larger than 90°. These angles may be from about 100° to about 165° and may ideally be 135°. Further, the first-base angle 1674 and the second-base angle 1675 are smaller than 90°. These angles may be from about 15° to about 80° and may ideally be 45°.

Each of the ridges, the coupling ridges, and the waveguide cavities described herein may include radiused edges. With respect to the waveguide cavities, any of the points (i.e., junctions where two sidewalls of the waveguide cavity are joined) may include a radiused edge. If the waveguide cavity comprises a quadrilateral cross-sectional geometry, such as the waveguide cavity 102 illustrated in FIGS. 3A and 3B, then any of the four points of the waveguide cavity 102 may include a radiused edge. This includes the junction of the first filter sidewall 104*a* and the first portion 108*a* of the lower filter wall 108; the junction of the first filter sidewall 104*a* and the upper filter wall 106; the junction of the upper filter wall 106 and the second filter sidewall 104*b*; and the junction of the second filter sidewall 104*b* and the second portion 108*b* of the lower filter wall 108. As discussed herein, the junctions of the complex side may also be radiused because the edges of the ridge (or coupling ridge) that defines the complex side may all be radiused. As shown in FIGS. 7 and 8, for example, these junctions and edges may all be designed to connect at a sharp point rather than a radius.

Similarly, in the case of a waveguide cavity comprising a hexagonal cross-sectional geometry, such as the waveguide cavity 602 illustrated in FIGS. 8A and 8B, and the waveguide cavity 1102 illustrated in FIGS. 13A and 13B, each of the junctions of the waveguide cavity may comprise a radiused edge. This includes one or more of the six points of the hexagonal cross-sectional geometry. Additionally, the junctions formed within the one or more complex sides may additionally include radiused edges because the ridge (or coupling ridge) that defines the complex side may include radiused edges.

The naming conventions of the angles 1648, 1649, 1674, 1675 and sides 1642, 1644, 1646, 1647 are provided for ease of reference only, and should not be seen as limiting. For example, reference to "a first side" and "a second side" refers to any of the sides 1642, 1644, 1646, 1647 of the ridge 1613. As discussed herein, reference to a first side and a second side that is connected to the first side is to be interpreted as referring to any of the following combinations: the first ridge side 1646 connected to the ridge upper side 1644; the second ridge side 1647 connected to the ridge upper side 1644; the first ridge side 1646 connected to the ridge base 1642; and/or the second ridge side 1647 connected to the ridge base 1642. It should be noted that the interior angles relative to any of the aforementioned combinations of sides is non-orthogonal as shown in FIGS. 16A-16B.

The ridge 1613 includes two convex radiused edges 1651 and two concave radiused edges 1650. The ridge 1613 includes a convex radiused edge 1651 where the first ridge side 1646 connects with the ridge upper side 1644, and further where the second ridge side 1647 connects with the ridge upper side 1644. The ridge 1613 includes a concave radiused edge 1650 where the first ridge side 1646 connects with the ridge base 1642, and further where the second ridge side 1647 connects with the ridge base 1642.

The curvature of the convex radiused edges 1651 is measured as illustrated in FIG. 16B, wherein a circle 1663 matching the curvature is fit to the convex radiused edge 1651. The radius 1665 of the circle 1663 serves as the radius 1665 of the curvature of the convex radiused edge 1651. Similarly, the curvature of the concave radiused edges 1650 is measured based on a radius 1664 of a circle 1662 that matches the curvature of the concave radiused edge 1650. In the example illustrated in FIG. 16B, the radii 1664 of the concave radiused edges 1650 are equivalent or nearly equivalent to the radii 1665 of the convex radiused edges 1651. However, this need not be the case, and the circles 1662, 1663 may have different radii 1664, 1665. Additionally, the circles 1663 of the convex radiused edges 1651 need not have equivalent or nearly equivalent radii 1665 relative to each other, and the same goes for the circles 1662 of the concave radiused edges 1650.

The radiused edges 1650, 1651 are differentiated from sharp edges that come to a point. Sharp edges are prone to stress, high electromagnetic field concentrations, reduced mechanical strength, and issues in surface appearance. By contrast, the radiused edges 1650, 1651 introduce reduced stress concentration, even distribution of electromagnetic field concentrations, more uniform heating and cooling, and an improved appearance. Additionally, the radiused edges 1650, 1651 are implemented to improve the ability to fabricate the ridge 1613 using metal additive manufacturing techniques such that the ridge 1613 grows in the positive Z-axis direction relative to the build plate 1640.

Figure 17:
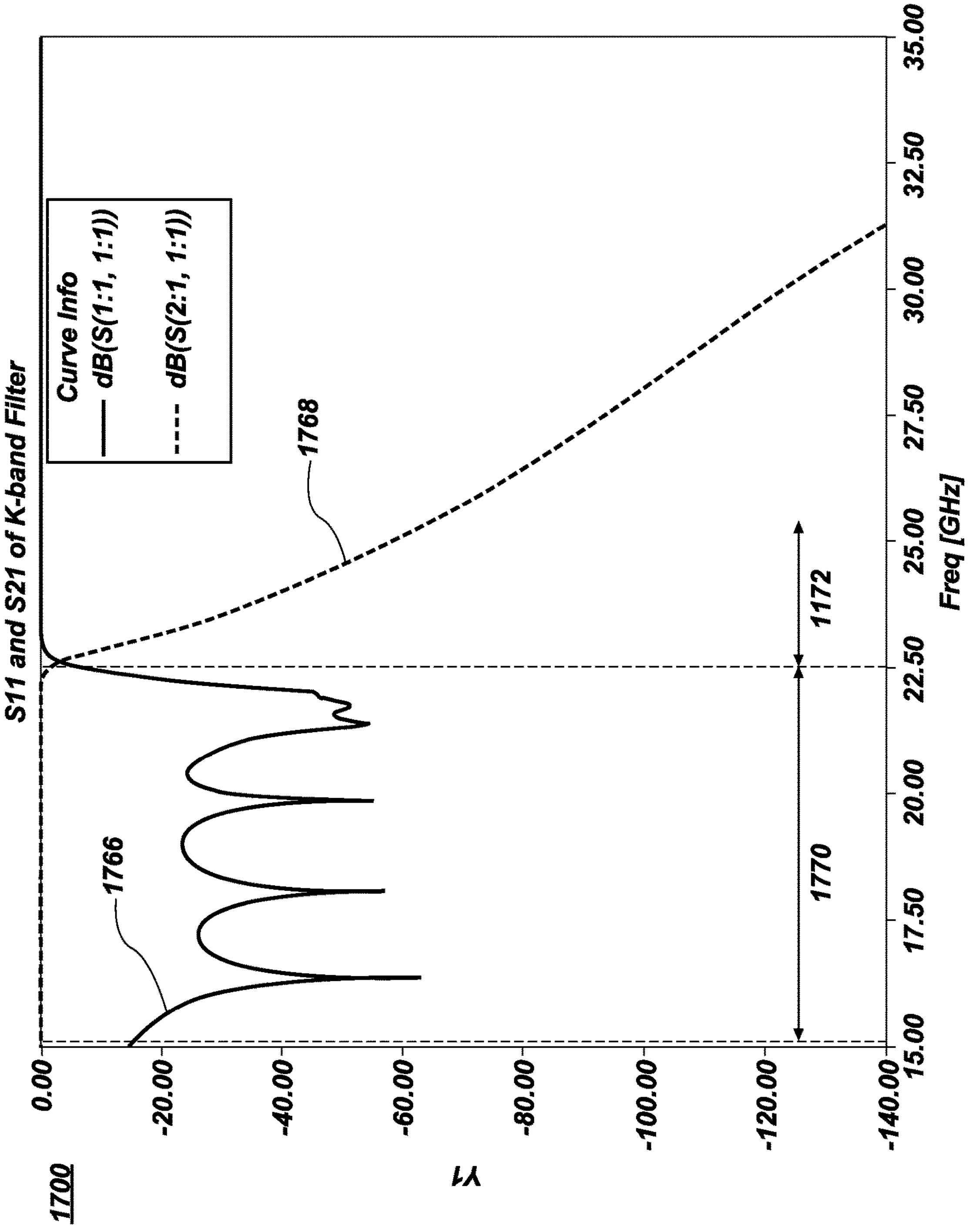
FIG. 17 illustrates a performance of an evanescent mode waveguide filter disclosed herein.

FIG. 17 illustrates a performance graph 1700 of the evanescent mode waveguide filters 100, 600, 1100 disclosed herein. The performance graph 1700 specifically depicts the S11 and S21 parameters of a K-band filter. The performance graph 1700 includes S parameters with the Y-axis corresponding to Y1 in units of decibels, while the X-axis illustrates frequency in GHz. As shown in FIG. 17, the S parameters are adjusted as the decibels and frequency change. The performance graph 1700 includes an electromagnetic signal return loss (S11) line 1766 and an insertion loss (rejection) (S21) line 1768. As shown in the performance graph 1700, signal return loss (S11) 1766 of a filter, such as any of the waveguide filters 100, 600, and 1100 shown in FIGS. 1, 6A, and 11, respectively, is located within a defined passband 1770. In this example, the passband is between 15.00 GHz and 22.50 GHz where the signal provides a very low (closer to zero) insertion loss 1768. At the same time, a rejection band 1772 illustrates that the signal insertion loss 1768 reduces significantly (becomes more negative in decibels) in the rejection band above 22.50 GHz.

As shown in FIG. 17, a sharp roll off from the signal insertion loss (rejection) (S21) 1768 at the rejection band 1772 illustrates excellent performance of the waveguide filters 100, 600, 1100 described herein. The waveguide filters 100, 600, 1100 are reliable at only allowing portions of an electromagnetic signal in the passband to pass through the filter.

EXAMPLES

The following examples pertain to features of further embodiments.

Example 1 is a waveguide filter that comprises a plurality of ridges aligned between a first propagation channel port and a second propagation channel port, wherein each one of the plurality of ridges comprises a first side and an upper side which are disposed at a non-orthogonal angle relative to each other.

Example 2 is the waveguide of example 1, wherein the plurality of ridges comprises a gap between each one of the plurality of ridges.

Example 3 is the waveguide of any of examples 1 and 2, further comprising a first ridge and a second ridge highly coupled by a first coupling ridge.

Example 4 is the waveguide filter of any of examples 1-3, wherein the plurality of ridges comprises one or more radiused edges.

Example 5 is the waveguide filter of any of examples 1-4, further comprising a rectangular body.

Example 6 is the waveguide filter of any of examples 1-5, wherein the waveguide filter is a single ridge waveguide filter.

Example 7 is the waveguide filter of any of examples 1-6, further comprising a hexagonal body.

Example 8 is the waveguide filter of any of examples 1-7, wherein the waveguide filter is a double ridge waveguide filter.

Example 9 is the waveguide filter of any of examples 1-8, wherein the waveguide filter comprises a second plurality of ridges, and wherein, the second plurality of ridges comprises a gap between each one of the plurality of ridges.

Example 10 is the waveguide filter of any of examples 1-9, wherein the waveguide filter is a single ridge waveguide filter.

Example 11 is the waveguide filter of any of examples 1-10, wherein the waveguide filter is constructed using additive manufacturing processes.

Example 12 is the waveguide filter of any of examples 1-11, wherein the waveguide filter is printed in three dimensions.

Example 13 is a waveguide filter comprising a first propagation port, one or more ridges which are highly coupled, a plurality of secondary ridges; and a second propagation channel port.

Example 14 is the waveguide filter of example 13, wherein the first propagation channel port, the one or more ridges which are highly coupled, the plurality of secondary ridges, and the second propagation channel port are aligned along an axis.

Example 15 is the waveguide filter of any of examples 13-14, wherein the one or more ridges which are highly coupled, and the plurality of secondary ridges are disposed in the waveguide filter between the first propagation channel port and the second propagation channel port.

Example 16 is the waveguide filter of any of examples 13-15, wherein the first propagation channel port, the one or more ridges which are highly coupled, the plurality of secondary ridges are disposed within a rectangular body.

Example 17 is the waveguide filter of any of examples 13-16, wherein the first propagation channel port, the one or more ridges which are highly coupled, the plurality of secondary ridges are disposed within an irregular hexagonal body.

Example 18 is a waveguide filter of any of examples 13-17 further comprising a second plurality of secondary ridges.

Example 19 a waveguide filter of any of examples 13-18, further comprising one or more ridges which are highly coupled aligned along an axis with the second plurality of secondary ridges.

Example 20 is a waveguide filter of any of examples 13-19, wherein the waveguide filter is constructed using additive manufacturing processes.

Example 21 is an apparatus. The apparatus includes a waveguide filter comprising a waveguide cavity and a plurality of ridges disposed within the waveguide cavity. The apparatus is such that each of the plurality of ridges comprises a first ridge side and a ridge upper side, and wherein the first ridge side and the ridge upper side are disposed at a non-orthogonal angle relative to one other.

Example 22 is an apparatus as in Example 21, wherein the plurality of ridges comprises: two or more highly coupled ridges; and one or more secondary ridges.

Example 23 is an apparatus as in any of Examples 21-22, wherein a pair of the two or more highly coupled ridges are attached to one another by way of a coupling ridge.

Example 24 is an apparatus as in any of Examples 21-23, wherein the one or more secondary ridges are not attached to any other ridge of the plurality of ridges such that there is an evanescent gap between at least one side of the one or more secondary ridges and a side of a neighboring ridge of the plurality of ridges.

Example 25 is an apparatus as in any of Examples 21-24, wherein the coupling ridge comprises one or more radiused edges.

Example 26 is an apparatus as in any of Examples 21-25, wherein at least one of the plurality of ridges comprises one or more radiused edges.

Example 27 is an apparatus as in any of Examples 21-26, wherein the waveguide cavity comprises an air volume for propagating an electromagnetic signal through the waveguide filter, and wherein the waveguide cavity comprises a quadrilateral cross-sectional geometry.

Example 28 is an apparatus as in any of Examples 21-27, wherein the waveguide cavity comprises an air volume for propagating an electromagnetic signal through the waveguide filter, and wherein the waveguide cavity comprises an irregular hexagonal cross-sectional geometry comprising a complex side.

Example 29 is an apparatus as in any of Examples 21-28, wherein the waveguide filter is a single ridge waveguide filter such that the plurality of ridges disposed within the waveguide cavity comprises a single series of ridges aligned along at least a portion of a length of the waveguide cavity.

Example 30 is an apparatus as in any of Examples 21-29, wherein the waveguide filter is a dual ridge waveguide filter such that the plurality of ridges disposed within the waveguide cavity comprises: a first series of ridges aligned along at least a portion of a length of the waveguide cavity on a first side of the waveguide cavity; and a second series of ridges aligned along at least a portion of the length of the waveguide cavity on a second side of the waveguide cavity; wherein the first side of the waveguide cavity is opposite from the second side of the waveguide cavity.

Example 31 is an apparatus as in any of Examples 21-30, wherein the apparatus is fabricated as a single metal element using metal additive manufacturing techniques.

Example 32 is an apparatus as in any of Examples 21-31, wherein the apparatus is fabricated in a positive Z-axis direction relative to a build plate, and wherein the apparatus is oriented relative to the build plate such that the apparatus comprises overhang angles of downward facing surfaces within a range from 25° and 65°.

Example 33 is an apparatus as in any of Examples 21-32, wherein each of the plurality of ridges comprises a trapezoidal cross-sectional geometry comprising: the first ridge side and a second ridge side, wherein the second ridge side is opposite from the first ridge side; a ridge base attached to a lower boundary of the waveguide cavity; and the ridge upper side; wherein the ridge upper side comprises a length that is shorter than a length of the ridge base.

Example 34 is an apparatus as in any of Examples 21-33, wherein a quantity of the plurality of ridges is optimized for filtering out electromagnetic signals comprising a frequency outside a desired frequency passband.

Example 35 is an apparatus as in any of Examples 21-34, wherein the frequency passband is from about 15 GHz to about 22.5 GHz.

Example 36 is an apparatus as in any of Examples 21-35, wherein dimensions of one or more of: the plurality of ridges, the coupling ridges, or the evanescent gaps are optimized for filtering out electromagnetic signals comprising a frequency outside a desired frequency passband.

Example 37 is an apparatus. The apparatus includes a waveguide filter comprising a waveguide cavity; a first propagation channel port disposed at a first end of the waveguide cavity; and a second propagation channel port disposed at a second end of the waveguide cavity, wherein the second end of the waveguide cavity is opposite from the first end of the waveguide cavity. The apparatus includes one or more ridges disposed within the waveguide cavity. The apparatus is such that each of the one or more ridges comprises a first ridge side and a ridge upper side, and wherein the first ridge side and the ridge upper side are disposed at a non-orthogonal angle relative to one another.

Example 38 is an apparatus as in Example 37, wherein each of the first propagation channel port, the one or more ridges disposed within the waveguide cavity, and the second propagation channel port are aligned along a longitudinal axis extending a length of the waveguide filter.

Example 39 is an apparatus as in any of Examples 37-38, wherein the waveguide cavity comprises negative space for propagating an electromagnetic signal from: the first propagation channel port to the second propagation channel port; and/or the second propagation channel port to the first propagation channel port; wherein the waveguide filter is bidirectional; and wherein the waveguide cavity comprises a quadrilateral cross-sectional geometry or a hexagonal cross-sectional geometry.

Example 40 is an apparatus as in any of Examples 37-39 wherein the apparatus is fabricated as a single element using metal additive manufacturing techniques.

Example 41 is an apparatus. The apparatus includes a waveguide filter comprising a waveguide cavity and a plurality of ridges disposed within the waveguide cavity. The apparatus is such that the plurality of ridges comprises a first side and a second side connected to the first side, and wherein the first side and the second side meet at a radiused edge.

Example 42 is an apparatus as in Example 41, wherein the radiused edge is a concave radiused edge.

Example 43 is an apparatus as in any of Examples 41-42, wherein the radiused edge is a convex radiused edge.

Example 44 is an apparatus as in any of Examples 41-43, wherein the apparatus is a waveguide filter comprising a first propagation port and a second propagation port; and wherein the plurality of ridges is optimized to prevent electromagnetic signals outside a desired frequency passband from exiting the waveguide cavity through either of the first propagation port or the second propagation port.

Example 45 is an apparatus as in any of Examples 41-44, wherein a cross-sectional geometry of the plurality of ridges is optimized based on the desired frequency passband.

Example 46 is an apparatus as in any of Examples 41-45, wherein a quantity of the plurality of ridges is optimized based on the desired frequency passband.

Example 47 is an apparatus as in any of Examples 41-46, wherein a length of an evanescent gap between any two of the plurality of ridges is optimized based on the desired frequency passband and rejection band performance.

Example 48 is an apparatus as in any of Examples 41-47, wherein the radiused edge comprises a radius defined by a circle matching a curvature of the radiused edge.

Example 49 is an apparatus as in any of Examples 41-48, wherein the first side comprises a first length that is different from a second length of the second side.

Example 51 is an apparatus as in any of Examples 41-50, wherein the first side and the second side constitute sides of a cross-sectional geometry of each of the plurality of ridges.

Example 52 is an apparatus as in any of Examples 41-51, wherein each of the plurality of ridges comprises a trapezoidal cross-sectional geometry.

Example 53 is an apparatus as in any of Examples 41-52, wherein the first side and the second side are disposed at a non-orthogonal angle relative to one another, and wherein the non-orthogonal angle is interior to the trapezoidal cross-sectional geometry.

Example 54 is an apparatus as in any of Examples 41-53, wherein the radiused edge is a concave radiused edge disposed on an exterior of the trapezoidal cross-sectional geometry, and wherein the non-orthogonal angle is less than 90°.

Example 55 is an apparatus as in any of Examples 41-54, wherein the non-orthogonal angle is from about 5° to about 85°.

Example 56 is an apparatus as in any of Examples 41-55, wherein the radiused edge is a convex radiused edge disposed on an interior of the trapezoidal cross-sectional geometry, and wherein the non-orthogonal angle is greater than 90°.

Example 57 is an apparatus as in any of Examples 41-56, wherein the non-orthogonal angle is from about 95° to about 175°.

Example 58 is an apparatus as in any of Examples 41-57, wherein the apparatus is fabricated as a single metal element using metal additive manufacturing techniques.

Example 59 is an apparatus as in any of Examples 41-58, wherein the apparatus is fabricated in a positive Z-axis direction relative to a build plate, and wherein the apparatus is oriented relative to the build plate such that the apparatus comprises overhang angles of downward facing surfaces within a range from 25° and 65°.

Example 60 is an apparatus as in any of Examples 41-59, wherein the plurality of ridges comprises: two or more highly coupled ridges that are attached to one another by way of a coupling ridge; and two or more ridges separated from one another by way of an evanescent gap, wherein the apparatus comprises an air volume whereby an electromagnetic signal may travel between the two or more ridges.

Example 61 is an apparatus as in any of Examples 41-60, wherein the waveguide filter is manufactured as a indivisible metal apparatus using additive manufacturing techniques.

Example 62 is an apparatus as in any of Examples 41-61, wherein the waveguide filter is a component of an integrated assembly.

Example 63 is an apparatus as in any of Examples 41-62, wherein the integrated assembly is manufactured as a single indivisible metal element using additive manufacturing techniques such that manufacturing the integrated assembly does not require a separate joining process for joining separate components.

Example 64 is an apparatus as in any of Examples 41-63, wherein the integrated assembly is an antenna array.

Example 65 is an apparatus. The apparatus includes a waveguide filter comprising a waveguide cavity and a plurality of ridges disposed within the waveguide cavity. Each of the plurality of ridges comprises a first side and a second side connected to the first side. The first side and the second side of at least one of the plurality of ridges are disposed at a non-orthogonal angle relative to one another.

Example 66 is an apparatus as in Example 65, wherein the plurality of ridges comprises two or more highly coupled ridges that are attached to one another by way of a coupling ridge.

Example 67 is an apparatus as in any of Examples 65-66, wherein the plurality of ridges comprises one or more secondary ridges that are not attached to any other ridge of the plurality of ridges such that there is an evanescent gap between at least one side of the one or more secondary ridges and a side of a neighboring ridge of the plurality of ridges.

Example 68 is an apparatus as in any of Examples 65-67, wherein the plurality of ridges comprises: two or more highly coupled ridges; and one or more secondary ridges.

Example 69 is an apparatus as in any of Examples 65-68, wherein a pair of the two or more highly coupled ridges are attached to one another by way of a coupling ridge.

Example 70 is an apparatus as in any of Examples 65-69, wherein the coupling ridge comprises one or more radiused edges.

Example 71 is an apparatus as in any of Examples 65-70, wherein the one or more secondary ridges are not attached to any other ridge of the plurality of ridges such that there is an evanescent gap between at least one side of the one or more secondary ridges and a side of a neighboring ridge of the plurality of ridges.

Example 72 is an apparatus as in any of Examples 65-71, wherein at least one of the plurality of ridges comprises one or more radiused edges.

Example 73 is an apparatus as in any of Examples 65-72, wherein the waveguide cavity comprises an air volume for propagating an electromagnetic signal through the waveguide filter, and wherein the waveguide cavity comprises a quadrilateral cross-sectional geometry.

Example 74 is an apparatus as in any of Examples 65-73, wherein each of the plurality of ridges is indivisibly attached to a sidewall of the waveguide cavity, and wherein the quadrilateral cross-sectional geometry comprises at least one complex side, and wherein the complex side of the waveguide cavity is defined by one or more of a ridge or a coupling ridge extending into the waveguide cavity.

Example 75 is an apparatus as in any of Examples 65-74, wherein the waveguide cavity comprises an air volume for propagating an electromagnetic signal through the waveguide filter, and wherein the waveguide cavity comprises an irregular hexagonal cross-sectional geometry.

Example 76 is an apparatus as in any of Examples 65-75, wherein each of the plurality of ridges is indivisibly attached to a sidewall of the waveguide cavity, and wherein the irregular hexagonal cross-sectional geometry comprises at least one complex side, and wherein the at least one complex side of the waveguide cavity is defined by one or more of a ridge or a coupling ridge extending into the waveguide cavity.

Example 77 is an apparatus as in any of Examples 65-76, wherein the waveguide cavity is a single ridge waveguide, and wherein the irregular hexagonal cross-sectional geometry of the waveguide cavity comprises a single complex side.

Example 78 is an apparatus as in any of Examples 65-77, wherein the waveguide cavity is a dual ridge waveguide, and wherein the irregular hexagonal cross-sectional geometry of the waveguide cavity comprises two complex sides.

Example 79 is an apparatus as in any of Examples 65-78, wherein the waveguide filter is a single ridge waveguide filter such that the plurality of ridges disposed within the waveguide cavity comprises a single series of ridges aligned along at least a portion of a length of the waveguide cavity.

Example 80 is an apparatus as in any of Examples 65-79, wherein the waveguide filter is a dual ridge waveguide filter such that the plurality of ridges disposed within the waveguide cavity comprises: a first series of ridges aligned along at least a portion of a length of the waveguide cavity on a first side of the waveguide cavity; and a second series of ridges aligned along at least a portion of the length of the waveguide cavity on a second side of the waveguide cavity; wherein the first side of the waveguide cavity is opposite from the second side of the waveguide cavity.

Example 81 is an apparatus as in any of Examples 65-80, wherein the apparatus is fabricated as a single indivisible metal element using metal additive manufacturing techniques.

Example 82 is an apparatus as in any of Examples 65-81, wherein the apparatus is fabricated in a positive Z-axis direction relative to a build plate, and wherein the apparatus is oriented relative to the build plate such that an overhang angle on any downward facing surface of the apparatus is greater than or equal to 25°.

Example 83 is an apparatus as in any of Examples 65-82, wherein each of the plurality of ridges comprises a trapezoidal cross-sectional geometry comprising: the first side and the second side, wherein the first side is connected to the second side; a third side connected to the second side, wherein the third side is opposite the first side; and a fourth side connected to the third side, wherein the fourth side is opposite the second side; wherein the first side and the third side form a first pair of opposite sides; wherein the second side and the fourth side form a second pair of opposite sides; and wherein at least one of the first pair of opposite sides or the second pair of opposite sides comprises sides with non-equivalent lengths relative to each other.

Example 84 is an apparatus as in any of Examples 65-83, wherein: one of the first side, the second side, the third side, or the fourth side is a ridge base that is indivisibly attached to a lower boundary of the waveguide cavity; and wherein a side that is opposite to the ridge base comprises a length that is shorter than a length of the ridge base.

Example 85 is an apparatus as in any of Examples 65-84, wherein a quantity of the plurality of ridges is optimized for filtering out electromagnetic signals comprising a frequency outside a desired frequency passband.

Example 86 is an apparatus as in any of Examples 65-85, wherein dimensions of the plurality of ridges are optimized for filtering out electromagnetic signals comprising a frequency outside a desired frequency passband.

Example 87 is an apparatus as in any of Examples 65-86, wherein the plurality of ridges comprises two or more highly coupled ridges that are attached to one another by way of a coupling ridge, and wherein dimensions of the coupling ridge are optimized for filtering out electromagnetic signals comprising a frequency outside a desired frequency passband.

Example 88 is an apparatus as in any of Examples 65-87, wherein the plurality of ridges comprises one or more secondary ridges that are not attached to any other ridge of the plurality of ridges such that there is an evanescent gap between at least one side of the one or more secondary ridges and a side of a neighboring ridge of the plurality of ridges, and wherein dimensions of the evanescent gap are optimized for filtering out electromagnetic signals comprising a frequency outside a desired frequency passband.

Example 89 is an apparatus as in any of Examples 65-88, wherein at least one of the plurality of ridges comprises a concave radiused edge.

Example 90 is an apparatus as in any of Examples 65-89, wherein at least one of the plurality of ridges comprises a convex radiused edge.

Example 91 is an apparatus as in any of Examples 65-90, wherein the waveguide cavity comprises a plurality of junctions wherein a first sidewall of the waveguide cavity meets a second sidewall of the waveguide cavity, and wherein at least one of the plurality of junctions of the waveguide cavity comprises a radiused edge.

Example 92 is an apparatus. The apparatus includes a waveguide filter comprising a waveguide cavity, a first propagation channel port disposed at a first end of the waveguide cavity, and a second propagation channel port disposed at a second end of the waveguide cavity. The second end of the waveguide cavity is opposite from the first end of the waveguide cavity. The one or more ridges may be disposed within the waveguide cavity. Each of the one or more ridges comprises a first side and a second side connected to the first side, wherein the first side and the second side are disposed at a non-orthogonal angle relative to one another.

Example 93 is an apparatus as in Example 92, wherein each of the first propagation channel port, the one or more ridges disposed within the waveguide cavity, and the second propagation channel port are aligned along a longitudinal axis extending a length of the waveguide filter.

Example 94 is an apparatus as in any of Examples 92-93, wherein the waveguide cavity comprises negative space for propagating an electromagnetic signal within a desired passband while rejecting an electromagnetic signal within a desired rejection band from: the first propagation channel port to the second propagation channel port, and/or the second propagation channel port to the first propagation channel port; wherein the waveguide filter is bidirectional, and wherein the waveguide cavity comprises a quadrilateral cross-sectional geometry or a hexagonal cross-sectional geometry.

Example 94 is an apparatus as in any of Examples 92-93, wherein the apparatus is fabricated as a single indivisible metal element using metal additive manufacturing techniques.

Example 95 is an apparatus as in any of Examples 92-94, wherein the apparatus is a component of an integrated assembly, and wherein the integrated assembly is fabricated using the metal additive manufacturing techniques such that fabricating the integrated assembly does not require a separate joining process for joining separate components of the integrated assembly.

Example 96 is an apparatus as in any of Examples 92-95, wherein the integrated assembly is an antenna array, and wherein the apparatus is one component of the antenna array.

Example 97 is an apparatus. The apparatus includes a waveguide cavity for propagating an electromagnetic signal. The waveguide cavity is defined by a plurality of sidewalls. The waveguide cavity comprises an irregular hexagonal cross-sectional geometry that has a complex side. The complex side comprises a first side and a second side connected to the first side. The first side and the second side of the complex side meet at a radiused edge.

Example 98 is an apparatus as in Example 97, wherein the radiused edge is a concave radiused edge.

Example 99 is an apparatus as in any of Examples 97-98, wherein the radiused edge is a convex radiused edge.

Example 100 is an apparatus as in any of Examples 97-99, further comprising a ridge disposed within the waveguide cavity, wherein the ridge is indivisibly attached to a sidewall of the plurality of sidewalls and forms the complex side of the waveguide cavity.

Example 101 is an apparatus as in any of Examples 97-100, wherein the ridge extends into an air volume of the waveguide cavity and comprises: a ridge base indivisibly attached to the sidewall of the plurality of sidewalls; a first ridge side attached to the ridge base; a second ridge side attached to the ridge base; and a ridge upper side attached to each of the first ridge side and the second ridge side; wherein the complex side of the waveguide cavity is defined by a boundary defined by the first ridge side, a boundary defined by the ridge upper side, and a boundary defined by the second ridge side.

Example 102 is an apparatus as in any of Examples 97-101, wherein the ridge comprises a quadrilateral cross-sectional geometry.

Example 103 is an apparatus as in any of Examples 97-102, wherein the ridge comprises a trapezoidal cross-sectional geometry such that the ridge upper side comprises a length that is shorter than a length of the ridge base.

Example 104 is an apparatus as in any of Examples 97-103, wherein the ridge comprises internal angles that are non-orthogonal such that: a first internal angle between the ridge base and the first ridge side is less than 90°; a second internal angle between the first ridge side and the ridge upper side is greater than 90°; a third internal angle between the ridge upper side and the second ridge side is greater than 90°; and a fourth internal angle between the second ridge side and the ridge base is less than 90°.

Example 105 is an apparatus as in any of Examples 97-104, further comprising: a first propagation port at a first end of the waveguide cavity and a second propagation port at a second end of the waveguide cavity; and a plurality of ridges disposed within the waveguide cavity and attached to a sidewall of the plurality of sidewalls; wherein the plurality of ridges is optimized to prevent electromagnetic signals outside a desired frequency passband from propagating through the waveguide cavity through either of the first propagation port or the second propagation port.

Example 106 is an apparatus as in any of Examples 97-105, wherein a cross-sectional geometry of one or more of the plurality of ridges is optimized based on the desired frequency passband and a desired frequency rejection band.

Example 107 is an apparatus as in any of Examples 97-106, wherein a quantity of the plurality of ridges is optimized based on the desired frequency passband and a desired frequency rejection band.

Example 108 is an apparatus as in any of Examples 97-107, wherein a length of a coupling ridge or an evanescent gap between any two of the plurality of ridges is optimized based on the desired frequency passband and a desired frequency rejection band.

Example 109 is an apparatus as in any of Examples 97-108, wherein the first side and the second side of the complex side of the waveguide cavity are each defined by sides of a ridge disposed within the waveguide cavity, wherein the ridge is attached to a sidewall of the plurality of sidewalls.

Example 110 is an apparatus as in any of Examples 97-109, wherein the radiused edge is defined by a radiused edge of the ridge, and wherein the radiused edge of the ridge is disposed on an exterior of a trapezoidal cross-sectional geometry of the ridge.

Example 111 is an apparatus as in any of Examples 97-110, wherein the apparatus is fabricated as a single indivisible metal element using metal additive manufacturing techniques.

Example 112 is an apparatus as in any of Examples 97-111, wherein the apparatus is fabricated in a positive Z-axis direction relative to a build plate, and wherein the apparatus is oriented relative to the build plate such that an overhang angle on any downward facing surface of the apparatus is greater than or equal to 25°.

Example 113 is an apparatus as in any of Examples 97-112, wherein the overhang angle is between 25° and 89°.

Example 114 is an apparatus as in any of Examples 97-113, wherein the waveguide cavity is further defined by a plurality of junctions, and wherein each of the plurality of junctions is formed at a point where a first sidewall of the plurality of sidewalls meets a second sidewall of the plurality of sidewalls, and wherein at least one of the plurality of junctions is radiused.

Example 115 is an apparatus as in any of Examples 97-114, wherein the apparatus is a component of an integrated assembly that is fabricated using metal additive manufacturing techniques.

Example 116 is an apparatus as in any of Examples 97-115, wherein the integrated assembly is fabricated as a single indivisible metal element comprising the apparatus such that fabricating the integrated assembly does not require a separate joining process for joining separate components.

Example 117 is an apparatus as in any of Examples 97-116, wherein the integrated assembly is an antenna array that receives and/or transmits the electromagnetic signal, and wherein the apparatus is optimized to select electromagnetic signals within a desired frequency passband and reject electromagnetic signals within a desired frequency rejection band.

Example 118 is an apparatus as in any of Examples 97-117, wherein the waveguide cavity comprises a plurality of cross-sections along a length of the waveguide cavity, and wherein the plurality of cross-sections comprises: a complex cross section comprising the irregular hexagonal cross-sectional geometry that has one or more complex sides; and a non-complex cross section comprising an irregular hexagonal cross-sectional geometry that does not have a complex side.

Example 119 is an apparatus as in any of Examples 97-118, wherein the waveguide cavity comprises the complex cross section at a point along the length of the waveguide cavity wherein a ridge is attached to a sidewall of the plurality of sidewalls of the waveguide cavity.

Example 120 is an apparatus as in any of Examples 97-119, wherein the waveguide cavity comprises the non-complex cross section at a point along the length of the waveguide cavity wherein an evanescent gap is disposed between two ridges attached to the sidewall of the plurality of sidewalls of the waveguide cavity.

Example 121 is an apparatus as in any of Examples 97-120, further comprising a plurality of ridges disposed within the waveguide cavity, and wherein the plurality of ridges comprises: two or more highly coupled ridges that are attached to one another by way of a coupling ridge; and two or more ridges separated from one another by way of an evanescent gap, wherein the evanescent gap comprises an air volume without a ridge.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. An apparatus comprising:

a waveguide filter comprising a waveguide cavity, wherein the waveguide cavity is defined by a plurality of sidewalls; and a plurality of ridges disposed within the waveguide cavity;

wherein each of the plurality of ridges is attached to at least one sidewall of the plurality of sidewalls defining the waveguide cavity;

wherein each of the plurality of ridges comprises a first side and a second side connected to the first side, and wherein the first side and the second side of at least one of the plurality of ridges are disposed at a non-orthogonal angle relative to one another; and wherein only one ridge of the plurality of ridges is attached to any one sidewall of the plurality of sidewalls at any single point along a length of the waveguide cavity.

2. The apparatus of claim 1, wherein the plurality of ridges comprises two or more highly coupled ridges that are attached to one another by way of a coupling ridge.

3. The apparatus of claim 1, wherein the plurality of ridges comprises one or more secondary ridges that are not attached to any other ridge of the plurality of ridges such that there is an evanescent gap between at least one side of the one or more secondary ridges and a side of a neighboring ridge of the plurality of ridges.

4. The apparatus of claim 1, wherein the plurality of ridges comprises:

two or more highly coupled ridges; and one or more secondary ridges.

5. The apparatus of claim 4, wherein a pair of the two or more highly coupled ridges are attached to one another by way of a coupling ridge.

6. The apparatus of claim 5, wherein the coupling ridge comprises one or more radiused edges.

7. The apparatus of claim 4, wherein the one or more secondary ridges are not attached to any other ridge of the plurality of ridges such that there is an evanescent gap between at least one side of the one or more secondary ridges and a side of a neighboring ridge of the plurality of ridges.

8. The apparatus of claim 1, wherein at least one of the plurality of ridges comprises one or more radiused edges.

9. The apparatus of claim 1, wherein the waveguide cavity comprises an air volume for propagating an electromagnetic signal through the waveguide filter, and wherein the waveguide cavity comprises a quadrilateral cross-sectional geometry.

10. The apparatus of claim 9, wherein each of the plurality of ridges is indivisibly attached to a sidewall of the waveguide cavity, and wherein the quadrilateral cross-sectional geometry comprises at least one complex side, and wherein the at least one complex side of the waveguide cavity is defined by one or more of a ridge of the plurality of ridges, or a coupling ridge of the plurality of ridges into the waveguide cavity.

11. The apparatus of claim 1, wherein the waveguide cavity comprises an air volume for propagating an electromagnetic signal through the waveguide filter, and wherein the waveguide cavity comprises an irregular hexagonal cross-sectional geometry.

12. The apparatus of claim 11, wherein each of the plurality of ridges is indivisibly attached to a sidewall of the waveguide cavity, and wherein the irregular hexagonal cross-sectional geometry comprises at least one complex side, and wherein the at least one complex side of the waveguide cavity is defined by one or more of a ridge of the plurality of ridges, or a coupling ridge of the plurality of ridges, extending into the waveguide cavity.

13. The apparatus of claim 12, wherein the waveguide cavity is a single ridge waveguide, and wherein the irregular hexagonal cross-sectional geometry of the waveguide cavity comprises a single complex side.

14. The apparatus of claim 12, wherein the waveguide cavity is a dual ridge waveguide, and wherein the irregular hexagonal cross-sectional geometry of the waveguide cavity comprises two complex sides.

15. The apparatus of claim 1, wherein the waveguide filter is a single ridge waveguide filter such that the plurality of ridges disposed within the waveguide cavity comprises a single series of ridges aligned along at least a portion of a length of the waveguide cavity.

16. The apparatus of claim 1, wherein the waveguide filter is a dual ridge waveguide filter such that the plurality of ridges disposed within the waveguide cavity comprises:

a first series of ridges aligned along at least a portion of a length of the waveguide cavity on a first side of the waveguide cavity; and a second series of ridges aligned along at least a portion of the length of the waveguide cavity on a second side of the waveguide cavity;

wherein the first side of the waveguide cavity is opposite from the second side of the waveguide cavity.

17. The apparatus of claim 1, wherein the apparatus is fabricated as a single indivisible metal element using metal additive manufacturing techniques.

18. The apparatus of claim 17, wherein the apparatus is fabricated in a positive Z-axis direction relative to a build plate, and wherein the apparatus is oriented relative to the build plate such that an overhang angle on any downward facing surface of the apparatus is greater than or equal to 25°.

19. The apparatus of claim 1, wherein each of the plurality of ridges comprises a trapezoidal cross-sectional geometry comprising:
- the first side and the second side, wherein the first side is connected to the second side;
- a third side connected to the second side, wherein the third side is opposite the first side; and
- a fourth side connected to the third side, wherein the fourth side is opposite the second side;
- wherein the first side and the third side form a first pair of opposite sides;
- wherein the second side and the fourth side form a second pair of opposite sides; and
- wherein at least one of the first pair of opposite sides or the second pair of opposite sides comprises sides with non-equivalent lengths relative to each other.

20. The apparatus of claim 19, wherein:
- one of the first side, the second side, the third side, or the fourth side is a ridge base that is indivisibly attached to a lower boundary of the waveguide cavity; and
- wherein one of the first side, the second side, the third side, or the fourth side constitutes an opposite side that is opposite to the ridge base, and wherein the opposite side comprises a length that is shorter than a length of the ridge base.

21. The apparatus of claim 1, wherein a quantity of the plurality of ridges is optimized for filtering out electromagnetic signals comprising a frequency outside a desired frequency passband.

22. The apparatus of claim 1, wherein dimensions of the plurality of ridges are optimized for filtering out electromagnetic signals comprising a frequency outside a desired frequency passband.

23. The apparatus of claim 1, wherein the plurality of ridges comprises two or more highly coupled ridges that are attached to one another by way of a coupling ridge, and wherein dimensions of the coupling ridge are optimized for filtering out electromagnetic signals comprising a frequency outside a desired frequency passband.

24. The apparatus of claim 1, wherein the plurality of ridges comprises one or more secondary ridges that are not attached to any other ridge of the plurality of ridges such that there is an evanescent gap between at least one side of the one or more secondary ridges and a side of a neighboring ridge of the plurality of ridges, and wherein dimensions of the evanescent gap are optimized for filtering out electromagnetic signals comprising a frequency outside a desired frequency passband.

25. The apparatus of claim 1, wherein at least one of the plurality of ridges comprises a concave radiused edge.

26. The apparatus of claim 1, wherein at least one of the plurality of ridges comprises a convex radiused edge.

27. The apparatus of claim 1, wherein the waveguide cavity comprises a plurality of junctions wherein a first sidewall of the waveguide cavity meets a second sidewall of the waveguide cavity, and wherein at least one of the plurality of junctions of the waveguide cavity comprises a radiused edge.

28. An apparatus comprising:
- a waveguide filter comprising a waveguide cavity, wherein the waveguide cavity is defined by a plurality of sidewalls;
- a first propagation channel port disposed at a first end of the waveguide cavity; and
- a second propagation channel port disposed at a second end of the waveguide cavity, wherein the second end of the waveguide cavity is opposite from the first end of the waveguide cavity; and
- one or more ridges disposed within the waveguide cavity;
- wherein each of the one or more ridges is attached to at least one sidewall of the plurality of sidewalls defining the waveguide cavity;
- wherein each of the one or more ridges comprises a first side and a second side connected to the first side and, wherein the first side and the second side are disposed at a non-orthogonal angle relative to one another;
- wherein only one ridge of the one or more ridges is attached to any one sidewall of the plurality of sidewalls at any single point along a length of the waveguide cavity.

29. The apparatus of claim 28, wherein each of the first propagation channel port, the one or more ridges disposed within the waveguide cavity, and the second propagation channel port are aligned along a longitudinal axis extending a length of the waveguide filter.

30. The apparatus of claim 28, wherein the waveguide cavity comprises negative space for propagating an electromagnetic signal within a desired passband while rejecting an electromagnetic signal within a desired rejection band from:
- the first propagation channel port to the second propagation channel port; and/or
- the second propagation channel port to the first propagation channel port;
- wherein the waveguide filter is bidirectional; and
- wherein the waveguide cavity comprises a quadrilateral cross-sectional geometry or a hexagonal cross-sectional geometry.

31. The apparatus of claim 28, wherein the apparatus is fabricated as a single indivisible metal element using metal additive manufacturing techniques.

32. The apparatus of claim 31, wherein the apparatus is a component of an integrated assembly, and wherein the integrated assembly is fabricated using the metal additive manufacturing techniques such that fabricating the integrated assembly does not require a separate joining process for joining separate components of the integrated assembly.

* * * * *